United States Patent
Cannon et al.

[19]

[11] Patent Number: 5,963,961
[45] Date of Patent: Oct. 5, 1999

[54] DATABASE RECONSTRUCTION USING EMBEDDED DATABASE BACKUP CODES

[75] Inventors: David Maxwell Cannon; Kenneth Eugene Hannigan; Howard Newton Martin, all of Tucson, Ariz.

[73] Assignee: International Business Machines Corporation, Armonk, N.Y.

[21] Appl. No.: 08/978,526

[22] Filed: Nov. 25, 1997

[51] Int. Cl.$^6$ .................................................. G06F 17/30
[52] U.S. Cl. ...................... 707/202; 707/200; 395/182.13
[58] Field of Search ............................... 395/180, 182.13, 395/182.03; 707/200, 202

[56] References Cited

U.S. PATENT DOCUMENTS

| | | | |
|---|---|---|---|
| 5,511,190 | 4/1996 | Sharma et al. ............................... | 707/1 |
| 5,511,191 | 4/1996 | de Leeuw van Weenen et al. | 707/100 |
| 5,517,645 | 5/1996 | Stutz et al. ............................... | 395/680 |
| 5,574,906 | 11/1996 | Morris ......................................... | 707/1 |
| 5,592,669 | 1/1997 | Robinson et al. ....................... | 707/206 |
| 5,619,689 | 4/1997 | Kelly ......................................... | 707/201 |
| 5,813,017 | 9/1998 | Morris ....................................... | 707/204 |

OTHER PUBLICATIONS

"FileStore Database Analysis Scheme for IBM LAN Net-View Scan", *IBM Technical Disclosure Bulletin*, vol. 37, No. 7, Jul. 1994, pp. 513–514.

*Primary Examiner*—Paul V. Kulik
*Attorney, Agent, or Firm*—Gray Cary Ware & Freidenrich

[57] ABSTRACT

Files are stored along with embedded codes containing information useful in reconstructing a failed database that normally contains information about the files. Multiple user files are stored in the form of a managed file, identified by a managed filename. Storage of the managed file includes a number of sub-steps, among them the generation and storage of a first frame marker including a recognition pattern, the managed filename, a next-frame locator, and a sequence number distinguishing the first frame marker from other frame markers. Next, a self-describing header is generated and stored adjacent to the first frame marker. A first one of the user files is stored adjacent to the self-describing header. The self-describing header and following user file are exclusively associated with each other, and the header contains certain information about the adjacent user file. Storage of the user file and self-describing header may be punctuated by one or more intermittent frame markers, which are preferably stored at fixed intervals along the managed file. The sequence of storing a self-describing header, a user file, and any intermittent frame markers is repeated until a predetermined condition is satisfied, such as reaching the last user file for inclusion in the managed file. Then, a table-of-contents is generated and stored substantially adjacent the last user file. A frame trailer is then stored substantially adjacent the table-of-contents, the frame trailer containing information representing the position of the table-of-contents. Another aspect of the invention concerns database reconstruction using information including the embedded codes.

52 Claims, 10 Drawing Sheets

DATABASE RECONSTRUCTION USING EMBEDDED DATABASE BACKUP CODES

BACKGROUND OF THE INVENTION

1. Field of the Invention

The present invention generally relates to the storage of digital data signals. More particularly, one aspect of the invention concerns the storage of files along with embedded codes containing information useful in reconstructing a failed database that normally contains information about the files. Another aspect of the invention concerns database reconstruction using various information, including the embedded codes.

2. Description of the Related Art

The electronic management of data is central in this information era. Scientists and engineers have provided the necessary infrastructure for widespread public availability of an incredible volume of information. The internet is one chief example. In addition, the high-technology industry is continually achieving faster and more diverse methods for transmitting and receiving data. Some examples include satellite communications and the ever-increasing baud rates of commercially available computer modems.

With this information explosion, it is increasingly important for users to have some means for storing and conveniently managing their data. In this respect, the development of electronic data storage systems is more important than ever. And, engineers have squarely met the persistent challenge of customer demand by providing speedier and more reliable storage systems.

As an example, engineers at INTERNATIONAL BUSINESS MACHINES® (IBM®) have developed various flexible systems called "storage management servers", designed to store and manage data for remotely located clients. One particular system is called the ADSTAR™ Distributed Storage Manager (ADSM™) product. With the ADSM product, a central server is coupled to multiple client platforms and one or more administrators. The server provides storage, backup, retrieval, and other management functions for the server's clients.

Although the ADSM product includes some significant advances and also enjoys significant commercial success today, IBM has continually sought to improve the performance and efficiency of this and other data storage systems. One area of particular focus is the maintenance of information about clients' data. For this purpose, many storage systems maintain catalogs, directories, tables, and/or other database information.

On a positive note, such databases significantly boost the speed and reliability of their storage systems. However, strong reliance on information in these databases can make customers especially vulnerable to a potentially devastating database failure. Databases may be lost, for example, due to a storage device failure, corruption (such as media imperfection, software glitch, etc.), natural disaster, carelessness, and a variety of other reasons. In many cases, a database failure does not affect the underlying data, which is stored in a separate storage region or storage device. Despite the surviving integrity of the data itself, systems that are heavily reliant upon database information are nonetheless impotent to access that data.

Although some useful solutions have been proposed for these problems, IBM is nevertheless seeking better ways of addressing these problems to further improve the performance and the efficiency of its products to benefit its customers.

SUMMARY OF THE INVENTION

Broadly, the present invention concerns the storage of files along with embedded codes containing information useful in reconstructing a failed database that normally contains information about the files. Multiple user files are stored in aggregate form as a "managed" file, identified by a managed filename. Storage of the managed file includes a number of sub-steps, among them the generation and storage of a first frame marker. The first frame marker includes a predetermined recognition pattern, the managed filename, and a sequence number distinguishing the first frame marker from other frame markers.

Next, a self-describing header is generated and stored adjacent to the first frame marker. A first one of the user files is stored adjacent to the self-describing header. The self-describing header and following user file are exclusively associated with each other, and the header contains certain information about the adjacent user file. Storage of each user file (and its preceding self-describing header) may be punctuated by one or more intermittent frame markers, which are preferably stored at fixed intervals throughout the managed file. The sequence of storing a self-describing header, a user file, and any intermittent frame markers, is repeated until a predetermined condition is satisfied.

After storage of the last user file, a table-of-contents is generated and stored substantially adjacent to this user file. A frame trailer is then stored substantially adjacent the table-of-contents, the frame trailer containing information representing the starting position of the table-of-contents. A different aspect of the invention concerns database reconstruction using information including the embedded codes.

Accordingly, in one embodiment, the invention may be implemented to provide a method of storing data with embedded codes containing information about the data, or a method of reconstructing a database using information including such embedded codes. In another embodiment, the invention may be implemented to provide an apparatus, such as a data storage subsystem, configured to store data with embedded codes containing information about the data, or to reconstruct a database using information including such embedded codes. In a different embodiment, the invention may be implemented to provide an article of manufacture, in the form of a data storage medium storing data with embedded codes containing information about the data itself. In still another embodiment, the invention may be implemented to provide a signal-bearing medium tangibly embodying a program of machine-readable instructions executable by a digital data processing apparatus to perform a method for storing data with embedded codes containing information about the data, or for reconstructing a database using information including such embedded codes.

The invention affords its users with a number of distinct advantages. Chiefly, the invention helps protect against failure or other loss of database information concerning stored data files. As mentioned above, this is achieved by storing this database information in codes embedded in the stored data. The invention also provides a number of other advantages and benefits, which should be apparent from the following description of the invention.

DETAILED DESCRIPTION OF THE PREFERRED EMBODIMENTS

Figure 1:
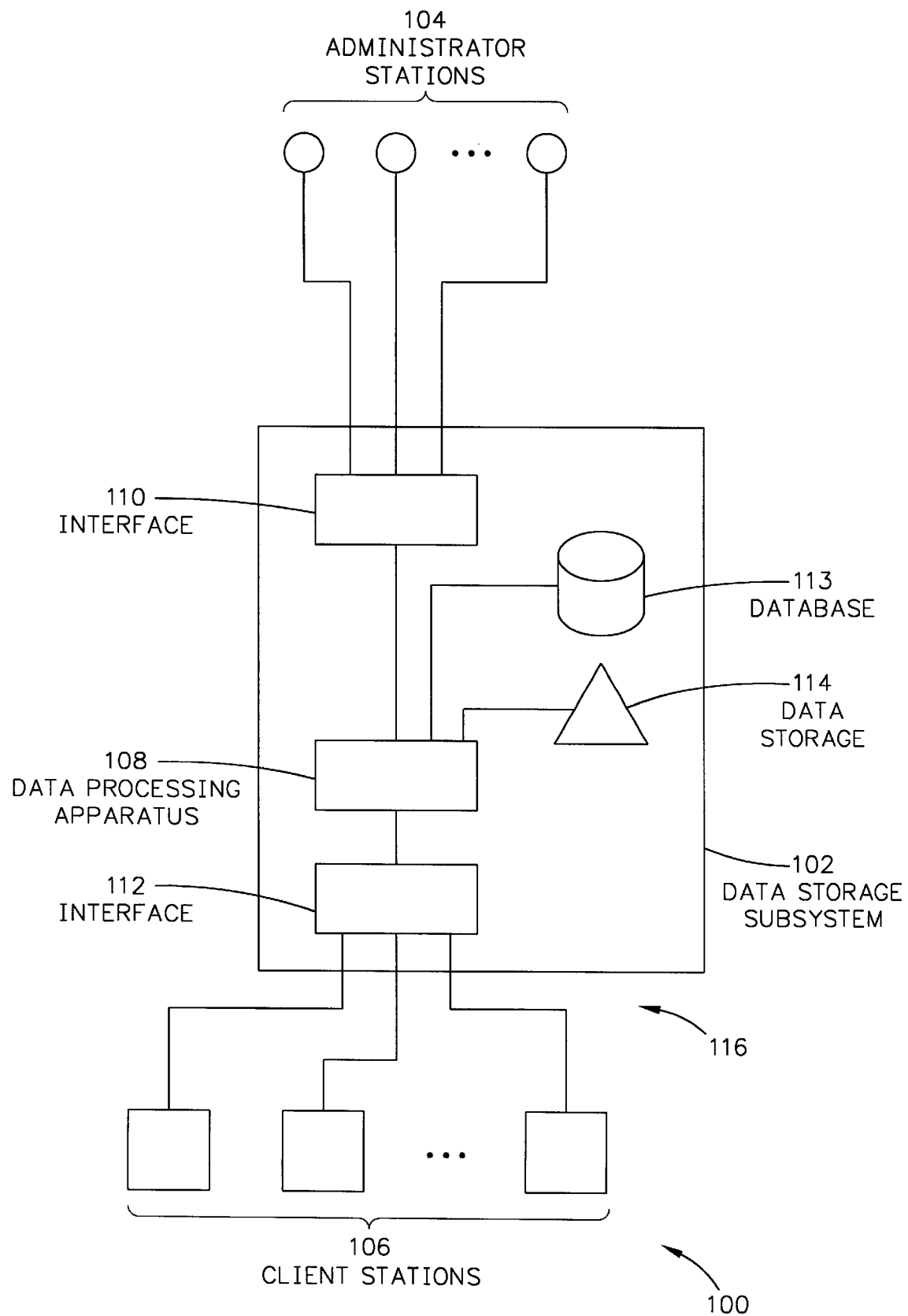
FIG. 1 is a block diagram of the hardware components and interconnections of a storage management system in accordance with the invention.

The nature, objects, and advantages of the invention will become more apparent to those skilled in the art after considering the following detailed description in connection with the accompanying drawings. As mentioned above, the invention concerns the storage of files along with embedded codes containing information useful in reconstructing a failed database that normally contains information about the files.

HARDWARE COMPONENTS & INTERCONNECTIONS

General Description of Data Storage System
Introduction

One aspect of the invention concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files". In this regard, each client station 106 separately employs the subsystem 102 to archive, backup, retrieve, and restore its user files. Accordingly, each user file is associated with a single client station 106, which is the source of that user file.

Client Stations

Each client station 106 may comprise any general purpose computer, such as an RS-6000 based workstation, PENTIUM processor based personal computer, mainframe computer, etc. The client stations 106 may comprise similar or different machines, running the similar or different operating systems. Some exemplary operating systems include VMS, MVS, UNIX, OS/2, WINDOWS-NT, OS-400, DOS, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, shared memory, etc. Preferably, a high speed communication channel such as a T3 link is used, employing a network protocol such as APPC or TCP/IP.

Administrator Stations

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

Data Storage Subsystem: Subcomponents

In an exemplary embodiment, the data storage subsystem 102 may comprise a commercially available server such as an IBM ADSM product. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110/112 may comprise any suitable device for communicating with the implemented embodiment of client station and administrator station. For example, the interfaces 110/112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a storage hierarchy 114. As discussed in greater detail below, the storage hierarchy 114 is used to store "managed files". A managed file may include an individual user file (stored as such), or multiple constituent user files stored together as an "aggregate" type managed file. The subsystem's storage of user files protects these files from loss or corruption on the client's machine, assists the clients by freeing storage space at the client stations, and also provides more sophisticated management of client data. In this respect, operations of the storage hierarchy 114 include "archiving" files from the client stations 106, "backing up" files of the client stations 106 contained in the storage hierarchy 114, "retrieving" stored files for the client stations 106, and "restoring" files backed-up on the hierarchy 114.

The database 113 contains information about the files contained in the storage hierarchy 114. This information, for example, includes the addresses at which files are stored, various characteristics of the stored data, certain client-specified data management preferences, etc. The contents of the database 113 are discussed in detail below.

More Detail: Exemplary Data Processing Apparatus

Figure 2:
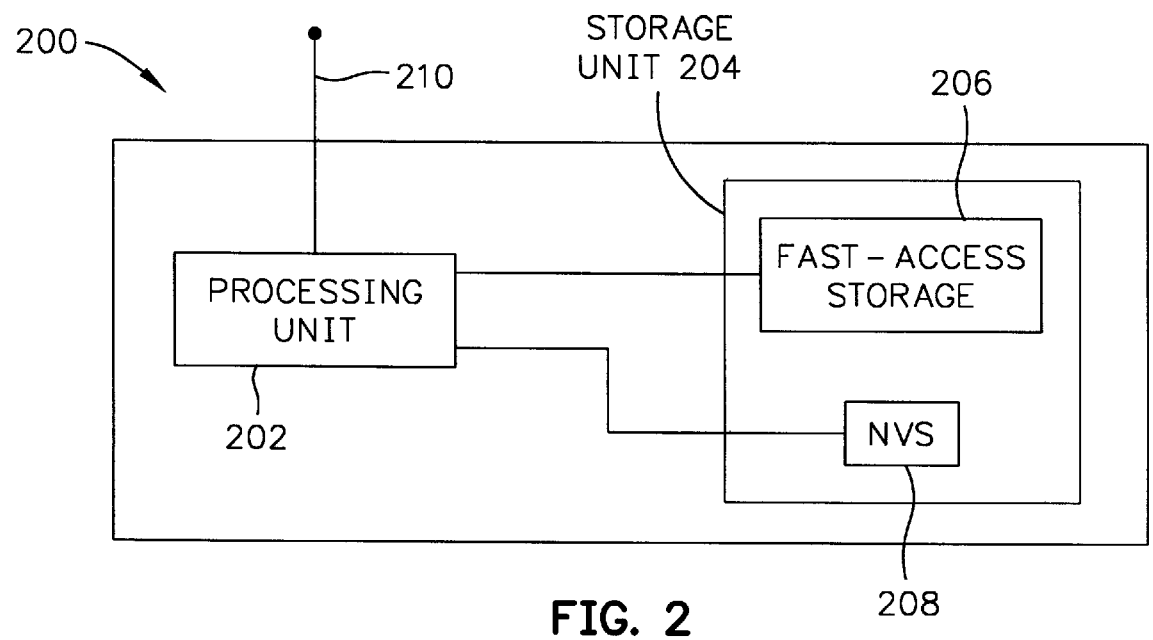
FIG. 2 is a block diagram of a digital data processing machine in accordance with the invention.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes a fast-access storage 206 as well as nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

More Detail: Storage Hierarchy

Figure 4:
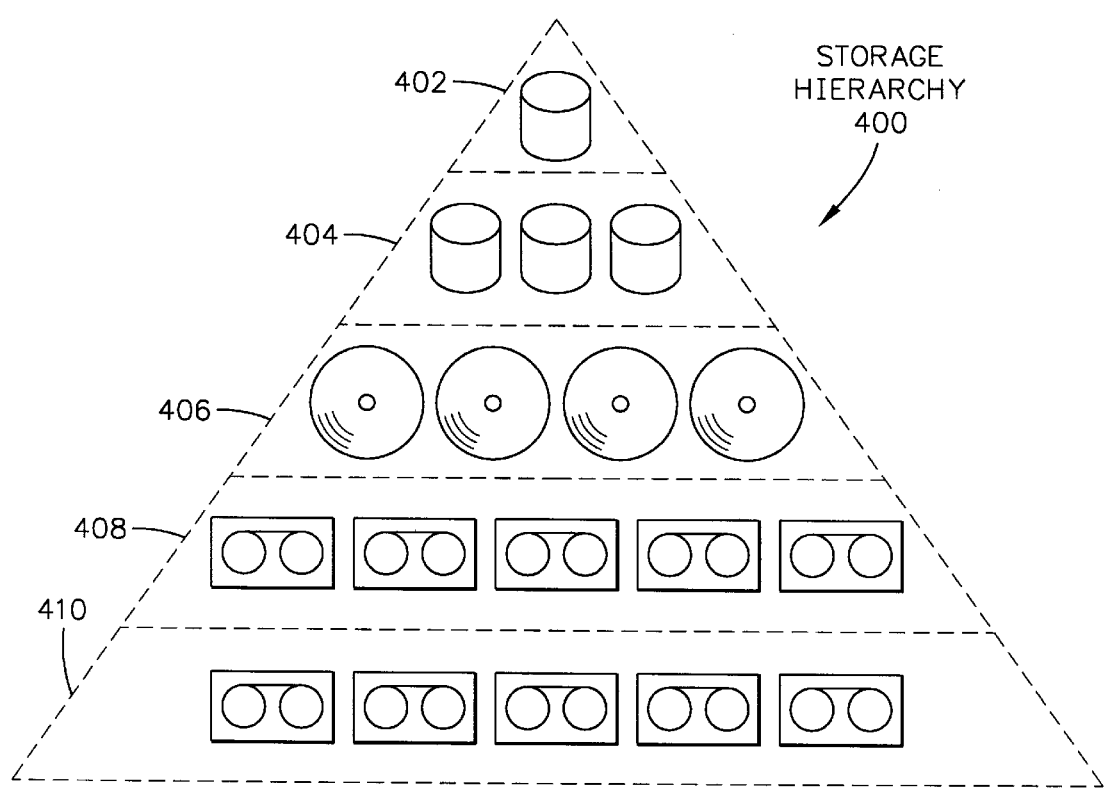
FIG. 4 is a block diagram showing the subcomponents of an illustrative storage hierarchy in accordance with the invention.

The storage hierarchy 114 may be implemented in storage media of various number and characteristics, depending upon the clients particular requirements. To specifically illustrate one example, FIG. 4 depicts a representative storage hierarchy 400. The hierarchy 400 includes multiple levels 402–410, where successively higher levels represent incrementally higher storage performance. The levels 402–410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402–410, albeit the most expensive. The second level 404 includes DASDs with less desirable performance characteristics than the level 402, but with lower expense. The third level 406 includes multiple optical disks and one or more optical disk drives. The fourth and fifth levels 408–410 include even less expensive storage means, such as magnetic tape or another sequential access storage device.

The levels 408–410 may be especially suitable for inexpensive, long-term data archival, whereas the levels 402–406 are appropriate for short-term fast access data storage. As an example, one or more devices in the level 402 and/or level 404 may even be implemented to provide a data storage cache.

Devices of the levels 402–410 may be co-located with the subsystem 102, or remotely located, depending upon the user's requirements. Storage devices of the hierarchy 400 may be coupled to the data processing apparatus 108 by a variety of means, such as one or more conductive wires or busses, fiber optic lines, data communication channels, wireless links, internet connections, telephone lines, SCSI connection, ESCON connect, etc.

Although not shown, the hierarchy 400 may be implemented with a single device type, and a corresponding single level. Ordinarily skilled artisans will recognize the "hierarchy" being used illustratively, since the invention prefers but does not require a hierarchy of storage device performance.

In the context of the storage hierarchy 114/400, the term "storage pool" is used to identify a group of storage devices with similar performance characteristics. For instance, the level 404 may be comprised of several storage pools, each pool including one or more DASDs.

More Detail: Database

Introduction

As mentioned above, the database 113 is used to store various information about data contained in the storage hierarchy 114. This information, for example, includes the addresses at which managed files are stored in the storage hierarchy 114, various characteristics of the stored data, certain client-specified data management preferences, etc.

File Aggregation

One of the key features of the present invention is storage and use of "managed" files, each comprising an aggregation of one or multiple constituent "user" files. The "user" files are created by the client stations 106, and managed by the subsystem 102 as a service to the client stations 106. The subsystem 102's use of managed files, however, is transparent to the client stations 106, which simply regard user files individually. This "internal" management scheme helps to significantly reduce file management overhead costs by using managed files constructed as aggregations of many different user files. In particular, the subsystem 102 treats each managed file as a single file during backup, move, and other subsystem operations, reducing the file management overhead to that of a single file.

Figure 5:
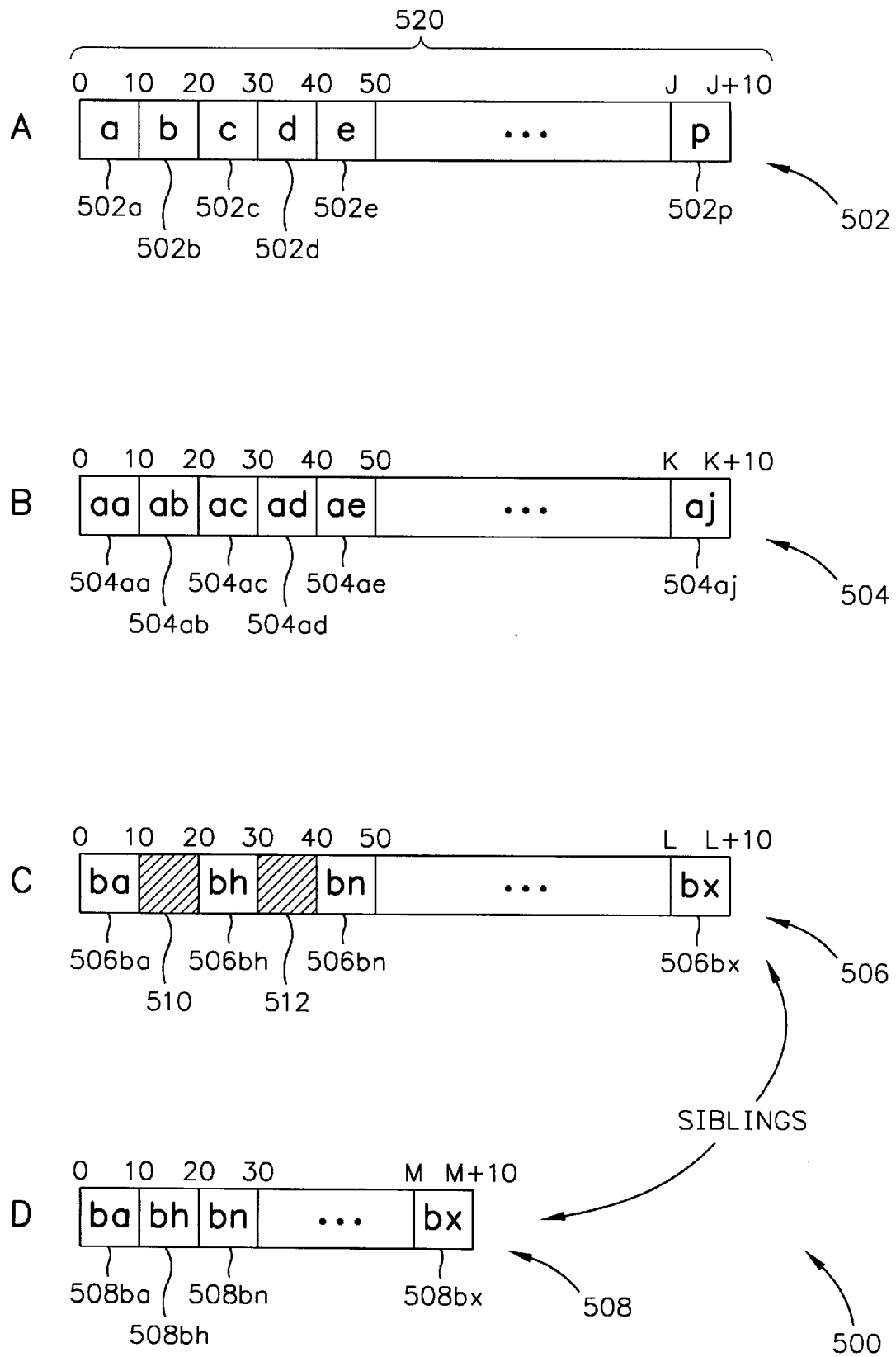
FIG. 5 is a block diagram showing the interrelationship of various illustrative user files and managed files in accordance with the invention.

FIG. 5 shows an exemplary set of four managed files 502–508. Managed files are also referenced by corresponding alphabetic designators A–D, for simpler representation in various tables shown below. For ease of explanation, upper case alphabetic designators refer to aggregate files, whereas lower case designators point out user files.

The managed file 502 includes multiple user files 502a–502p (also identified by alphabetic designators a–p). The user files 502a–502p are preferably stored adjacent to each other to conserve storage space. The position of each user file in the managed file 502 is denoted by a corresponding one of the "offsets" 520. In an exemplary implementation, the offsets may represent bytes of data. Thus, the first user file 502a has an offset of zero bytes, and the second user file 502b has an offset of ten bytes. In the simplified example of FIG. 5, all user files are ten bytes long.

FIG. 5 also depicts other managed files 504, 506, and 508, each including various user files. Managed files 502 and 504 include different sets of user files. In contrast, the managed files 506 and 508 contain completely identical sets of constituent user files. In this example, the managed file 506 contains unused areas 510/512 that were once occupied by user files later deleted. As shown in FIG. 5, the files 506ba, 506bh, 506bn . . . 506bx are present in both managed files 506 and 508. In this case, the managed file 508 represents a consolidation of the managed file 506, created by the subsystem 102 during an operation called "reclamation", as discussed below.

Tables

The database 113 is composed of various information including tables that store information about data contained in the storage hierarchy 114. In an illustrative example, these tables include: an inventory table, a storage table, a mapping table, and a managed file attributes table. Each table provides a different type of information, exemplified in the description below. Ordinarily skilled artisans (having the benefit of this disclosure) will quickly recognize that the tables shown below are merely examples, that this data may be integrated, consolidated, or otherwise reconfigured, and that their structure and contents may be significantly changed, all without departing from the scope of the present invention. For example, instead of tables, this data may be organized as one or more object-oriented databases.

Inventory Table

One table in the database 113 is the inventory table, an example of which is depicted in Table 1 (below). The inventory table contains information specific to each user file stored in the subsystem 102, regardless of the location and manner of storing the user files. Generally, the inventory table cross-references each user file with various "client" information and various "policy" information. More particularly, each user file is listed by its filename, which may comprise any alphabetic, alphanumeric, numeric, or other code uniquely associated with that user file. The inventory table contains one row for each user file.

The client information includes information relative to the client station 106 with which the user file is associated. In the illustrated example, the client information is represented by "client" number, "client type", and "source" columns. For each user file, the "client number" column identifies the originating client station 106. This identification may include a unique numeric, alphabetic, alphanumeric, or other code. In this example, a numeric code is shown. The "client type" column associates the client with one or more predetermined categories, such as different computer types, operating systems, communications parameters, etc. The "source" column lists a location in the client station 106 where the user file is stored locally by the client. As a specific example, a user file's source may comprise a directory in the client station along with the client's name for the user file.

In contrast to the client information of Table 1, the policy information includes information concerning the client's preferences for data management by the subsystem 102. Optimally, this information includes the client's preferences themselves, as well as information needed to implement these preferences. In the illustrated example, the policy information is represented by "data retention time" as well as other (not shown) columns, listing a maximum number of backup versions to maintain, timestamps of backed-up data, etc.

TABLE 1

Inventory Table

| USER FILE-NAME | CLIENT NUMBER | CLIENT TYPE | SOURCE | POLICY DATA RETENTION TIME |
|---|---|---|---|---|
| a | 1 | Unix | /usr | 30 days |
| b | 1 | Unix | /usr | 30 days |
| c | 1 | Unix | /usr | 30 days |
| d | 1 | Unix | /usr | 30 days |
| e | 1 | Unix | /usr | 30 days |
| . . . | 1 | Unix | /usr | 30 days |
| p | 1 | Unix | /usr | 30 days |
| aa | 27 | OS/2 | d:\data | 90 days |
| ab | 27 | OS/2 | d:\data | 90 days |
| ac | 27 | OS/2 | d:\data | 90 days |
| ad | 27 | OS/2 | d:\data | 90 days |
| ae | 27 | OS/2 | d:\data | 90 days |
| . . . | 27 | OS/2 | d:\data | 90 days |
| aj | 27 | OS/2 | d:\data | 90 days |
| ba | 3 | Windows '95 | c:\data | 365 days |
| bh | 3 | Windows '95 | c:\data | 365 days |
| bn | 3 | Windows '95 | c:\data | 365 days |
| bx | 3 | Windows '95 | c:\data | 365 days |

Storage Table

Another table in the database 113 is the storage table, an example of which is depicted in Table 2 (below). In contrast to the inventory table (described above), the storage table contains information about where each managed file is stored in the storage hierarchy 114. The storage table contains a single row for each managed file.

In the illustrated example, the storage table includes "managed filename", "storage pool", "volume", "location", and other columns. The "managed filename" column lists all managed file's filenames. Like the user files, each managed file has a filename that comprises a unique alphabetic, alphanumeric, numeric, or other code. For each managed file, the "storage pool" identifies a subset of the storage hierarchy 114 where the managed file resides. As mentioned above, each "storage pool" is a group of storage devices of the storage hierarchy 114 having similar performance characteristics. For instance, each of the DASDs 402, DASDs 404, optical disks 406, tapes 408, and tapes 410 may be divided into one or more storage pools. Identification of each storage pool may be made by numeric, alphabetic, alphanumeric, or another unique code. In the illustrated example, numeric codes are used.

The "volume" column identifies a sub-part of the identified storage pool. In the data storage arts, data is commonly grouped, stored, and managed in "volumes", where a volume may comprise a tape or a portion of a DASD. The "location" column identifies the corresponding managed file's location within the volume. As an example, this value may comprise a track/sector combination (for DASDs or optical disks), a tachometer reading (for magnetic or optical tape), etc.

TABLE 2

Storage Table

| MANAGED FILENAME | STORAGE POOL | VOLUME | LOCATION |
|---|---|---|---|
| A | 1 | 39 | 1965 |
| B | 1 | 39 | 1967 |
| C | 1 | 2 | 16495 |
| D | 2 | 11 | 1818 |

Mapping Table

Another table in the database 113 is the mapping table, an example of which is depicted in Table 3 (below). Generally, this table operates to bidirectionally cross-reference between managed files and user files. The mapping table identifies, for each managed file, all constituent user files. Conversely, for each user file, the mapping table identifies one or more managed files containing that user file. In this respect, the specific implementation of Table 3 includes a "managed→user" column and a "user→managed" column.

The "managed→user" column contains multiple rows for each managed file, each row identifying one constituent user file of that managed file. Each row identifies a managed/user file pair by the managed filename ("managed filename" column) and the user filename ("user filename").

Conversely, each row of the "user→managed" column lists a single user file by its name ("user filename" column), cross-referencing this user file to one managed file containing the user file ("managed filename"). If the user file is present in additional managed files, the mapping table contains another row for each additional such managed file. In each row, identifying one user/managed file pair, the row's user file is also cross-referenced to the user file's length ("length" column) and its offset within the aggregated file of that pair ("offset" column). In this example, the length and offset are given in bytes.

TABLE 3

Mapping Table

| (MANAGED --> USER) | | (USER --> MANAGED) | | | |
|---|---|---|---|---|---|
| MANAGED FILENAME | USER FILE-NAME | USER FILE-NAME | MANAGED FILENAME | LENGTH | OFFSET |
| A | a | a | A | 10 | 0 |
|   | b | b | A | 10 | 10 |
|   | c | c | A | 10 | 20 |
|   | d | d | A | 10 | 30 |
|   | e | e | A | 10 | 40 |
|   | ... | ... | A | 10 | ... |
|   | p | p | A | 10 | J |
| B | aa | aa | B | 10 | 0 |
|   | ab | ab | B | 10 | 10 |
|   | ac | ac | B | 10 | 20 |
|   | ad | ad | B | 10 | 30 |
|   | ae | ae | B | 10 | 40 |
|   | ... | ... | B | 10 | ... |
|   | aj | aj | B | 10 | K |
| C | ba | ba | C | 10 | 0 |
|   | bh | ba | D | 10 | 0 |
|   | bn | bh | C | 10 | 20 |
|   | ... | bh | D | 10 | 10 |
|   | bx | bn | C | 10 | 40 |
| D | ba | bn | D | 10 | 20 |
|   | bh | ... | ... | 10 | ... |
|   | bn | bx | C | 10 | L |
|   | bx | bx | D | 10 | M |

Managed File Attributes Table

Another table in the database 113 is the managed file attributes table, an example of which is depicted in Table 4 (below). This table accounts for the fact that, after time, a managed file may contain some empty space due to deletion of one or more constituent user files. As explained below, the subsystem 102 generally does not consolidate a managed file upon deletion of one or more constituent user files. This benefits the efficient operation of the subsystem 102, by minimizing management of the aggregate files.

Instead of consolidating deleted-file space, the invention may reclaim unused storage space when it becomes significantly large, or alternatively reconfigures the unused space for efficient compressed storage. These approaches are described in greater detail in the following U.S. Patent Applications, hereby incorporated by reference in their entirety:

1. U.S. patent application Ser. No. 08/960,627, entitled "Storage Management System with File Aggregation Supporting Multiple Aggregated File Counter Parts," filed on Oct. 29, 1997 in the names of Cannon et al, and assigned to IBM; and
2. U.S. patent application Ser. No. 08/977,549, entitled "Reconfiguring Data Objects Containing Unused Storage Space for Optimal Compression," in the names of Bradshaw et al., filed on Nov. 25, 1997, and assigned to IBM.

Each row of the managed file attributes table represents a different managed file, identified by its managed filename ("managed filename" column). A row's managed file is cross-referenced to columns specifying the managed file's original size upon creation ("original size"), present size not including deleted user files ("active size"), and number of non-deleted user files ("active files").

Other Tables

The database 113 may also be implemented to include a number of other tables, if desired, the content and structure being apparent to those of ordinary skill in the art (having the benefit of this disclosure). Some or all of these tables, for instance, may be added or incorporated into various existing tables discussed above. In a preferred embodiment, the database 113 includes a backup directory table (not shown) that indicates whether, for storage pool backup operations, each device or medium in the storage hierarchy 114 is designated as a primary device, designated as a backup device, or has no designation yet.

TABLE 4

Managed File Attributes Table

| MANAGED FILENAME | ORIGINAL SIZE | ACTIVE SIZE | ACTIVE FILES |
|---|---|---|---|
| A | J + 10 | J + 10 | 16 |
| B | K + 10 | K + 10 | 10 |
| C | L + 10 | M + 10 | 13 |
| D | M + 10 | M + 10 | 13 |

Data Storage Medium

Introduction

As mentioned above, one embodiment of the invention is a data storage medium bearing data with embedded codes containing certain information about the data. In contrast, completely different aspects of the invention involve methods for storing data with such embedded codes, and using information including these codes to reconstruct a database. These methods are discussed in greater detail below.

Figure 6A:
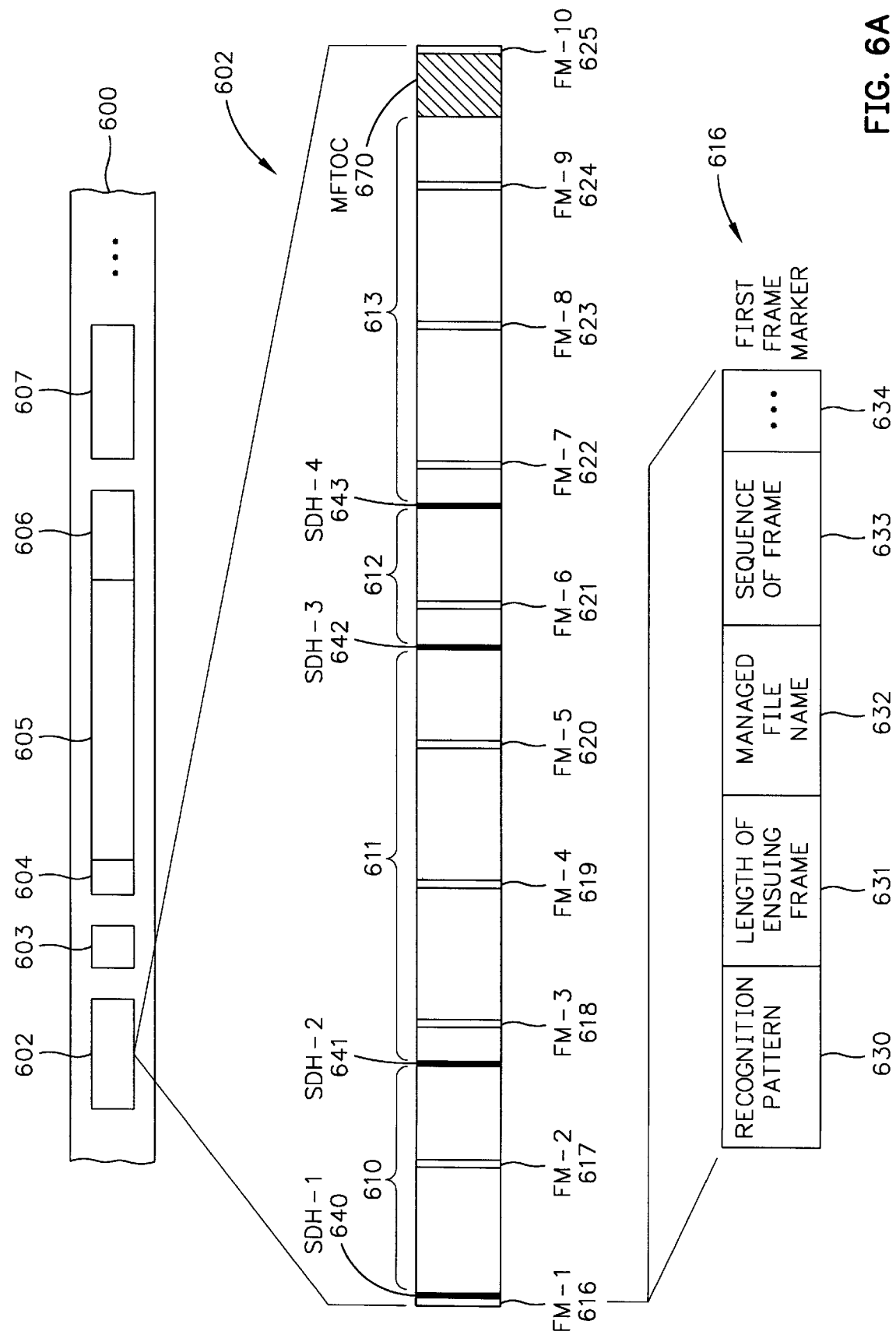
FIGS. 6A–6C are diagrams of an illustrative file storage format according to the invention.

The data storage medium itself may comprise any suitable article of manufacture, such as one or more surfaces of a magnetic hard drive, a magnetic diskette, writable optical disk, or a portion or combination of these storage media. FIG. 6A depicts a section of magnetic tape 600 as an example of data storage media.

The data storage medium contains data as well as certain codes embedded in the data. As shown in the specific examples below, the embedded codes in each managed file preferably contain information sufficient to reconstruct the certain entries of the database 113 concerning that managed file. More particularly, the embedded codes themselves are used to reconstruct the inventory table, and various other attributes of the stored data itself are used to reconstruct the storage, mapping, and managed file attributes tables. The database 113 is used only for purposes of illustration, since the embedded codes may contain a reduced or different set of information to replicate a different database (not shown) if desired.

As illustrated, the embedded codes include frame markers, self-describing headers, and a table-of-contents. The contents of these codes are explained in detail, as follows.

User Files/Managed File

Referring to FIG. 6A, the tape 600 itself is a component of the data storage 114, and therefore stores managed files and their constituent user files. In the illustrated example, the tape 600 includes managed files 602–607. Although the managed files 602–607 are preferably stored adjacent to each other to conserve storage space, there may be inter-file vacancies between the managed files for various reasons.

When originally created, each managed file comprises one or a contiguous assembly of multiple constituent user files. In the illustrated example, the managed file 602 includes multiple user files 610–613, shown in FIG. 6A. The creation of managed files is discussed in greater detail below.

Each managed file also includes various embedded codes, described as follows.

Frame Markers

One type of embedded code is the "frame marker". In the illustrated embodiment, frame markers mark the beginning and end of each managed file, and also occur in a pattern defined by various positions within the managed file. Each intervening region bounded by two frame markers represents a "frame". The frame markers are preferably located in the managed file at a repeating fixed interval, therefore creating equilength frames. In this embodiment, the last frame may be smaller if there is insufficient data to fill a full size frame. Since the frame markers occur at a fixed interval, and the user files' lengths may vary, one or more frame markers may occur within a user file. Also, frame marker may reside within self-describing headers.

As a more particular example, referring to FIG. 6A, the managed file 602 includes frame markers 616–625. The frame markers 616–624 may be considered frame "headers", with the frame marker 625 being a frame "trailer".

Each frame marker includes various fields. Referring to FIG. 6A, using the frame marker 616 as an example, these fields include a recognition pattern 630, a length 631 of the frame of which the frame marker 616 is a member, the filename 632 of the managed file containing the frame marker and a sequence 633 of the frame marker 616 respective to other frame markers. If desired, the frame marker 616 may also be implemented to include one or more other fields 634, trailing the fields 630–633 (as shown) and/or placed among the frames 630–633 (not shown). The order of the frame marker fields may be changed without departing from the scope of the invention.

The recognition pattern 630 comprises any predetermined bit pattern. As discussed below, recognition patterns are included in each frame marker so that a read sensor (such as a tape read/write head in the present example) can easily seek, locate, or otherwise find and position itself at the frame marker. As an example, the recognition pattern 630 may comprise a sequence of binary zeros of predetermined length, or a repeating bit pattern of some kind. Although not essential, each frame marker preferably includes identical recognition patterns.

The length field 631 may alternatively comprise any type of next-frame locator field, such as an offset of the next frame from any predetermined point, address of the next frame, length of user file following the current frame marker, etc.

Figure 6B:
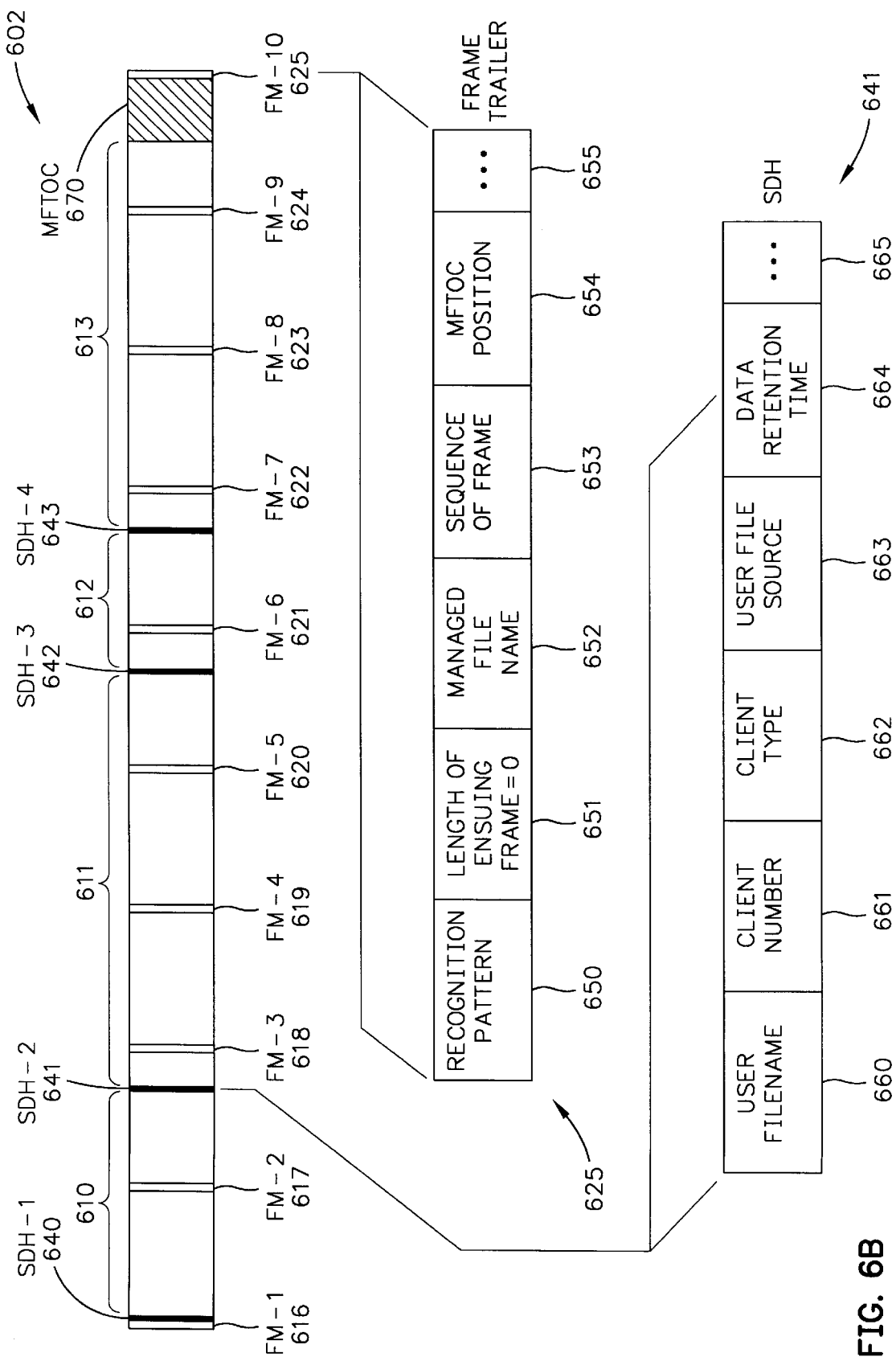

As mentioned above, the last frame marker 625 in the managed file 602 concludes the file, and is therefore called a "frame trailer". As illustrated in FIG. 6B, the frame trailer 625 generally includes the same fields as the other frame markers 616–624, i.e., a recognition pattern 650, length 651, managed filename 652, and sequence 653. One difference in the frame trailer 625, however, is that the length field 651 contains a zero value; this is because there is no frame following the trailer 625. Alternatively, any other artifice may be used to distinguish the frame trailer 625 as such, e.g., a predetermined bit pattern, unique sequence number, flag settings, etc. The frame trailer 625 is also distinguished from the other frame markers by including an additional field indicating a position 654 of a managed file table-of-contents 670, the contents of which are discussed below. As an example, the position field 654 may comprise an offset from the frame trailer 625 marking the table-of-contents 670, an offset from the first frame header 616, an absolute position, or any other value indicating a position of the table-of-contents 670. Preferably, the position field 654 indicates the beginning of the table-of-contents 670. If desired, the frame trailer 625 may also be implemented to include one or more other fields 655, trailing the fields 650–654 (as shown) and/or placed among the frames 650–654 (not shown). The order of fields in the frame trailer may be changed without departing from the scope of the invention.

Self-Describing Headers

In addition to the frame markers, another type of embedded code is the self-describing header. In the illustrated embodiment, self-describing headers occur immediately prior to each user file in the managed file. Each self-describing header is exclusively associated with the following user file, and contains all entries from the inventory table (Table 1, above) of the database 113 concerning that user file. Thus, as shown below, the inventory table may be reconstructed by compiling information from all self-describing headers.

As a more specific example, the managed file 602 includes a number of self-describing headers 640–643 (FIG. 6B). In the illustrated example, four self-describing headers are shown, since there are four user files 610–613. Each self-describing header includes certain fields. For example, as shown in FIG. 6B, the self-describing header fields may include the name of the ensuing user file 660, client number 661, client type 662, user file source 663, and data retention time 664. Each of these items is discussed above in conjunction with the inventory table (Table 1). If desired, the self-describing header 641 may also be implemented to include one or more other fields 665, trailing the fields 660–664 (as shown) and/or placed among the frames 660–664 (not shown). These other fields, for example, may include a different filename used by the client to identify the user file, a file type (such as "backup" or "archive"), etc. The order of the foregoing fields may be changed without departing from the invention. Furthermore, self-describing headers may be implemented without including the unique user filename 660, with this code, being generated anew upon reconstruction of the database 113.

Managed File Table of Contents

Figure 6C:
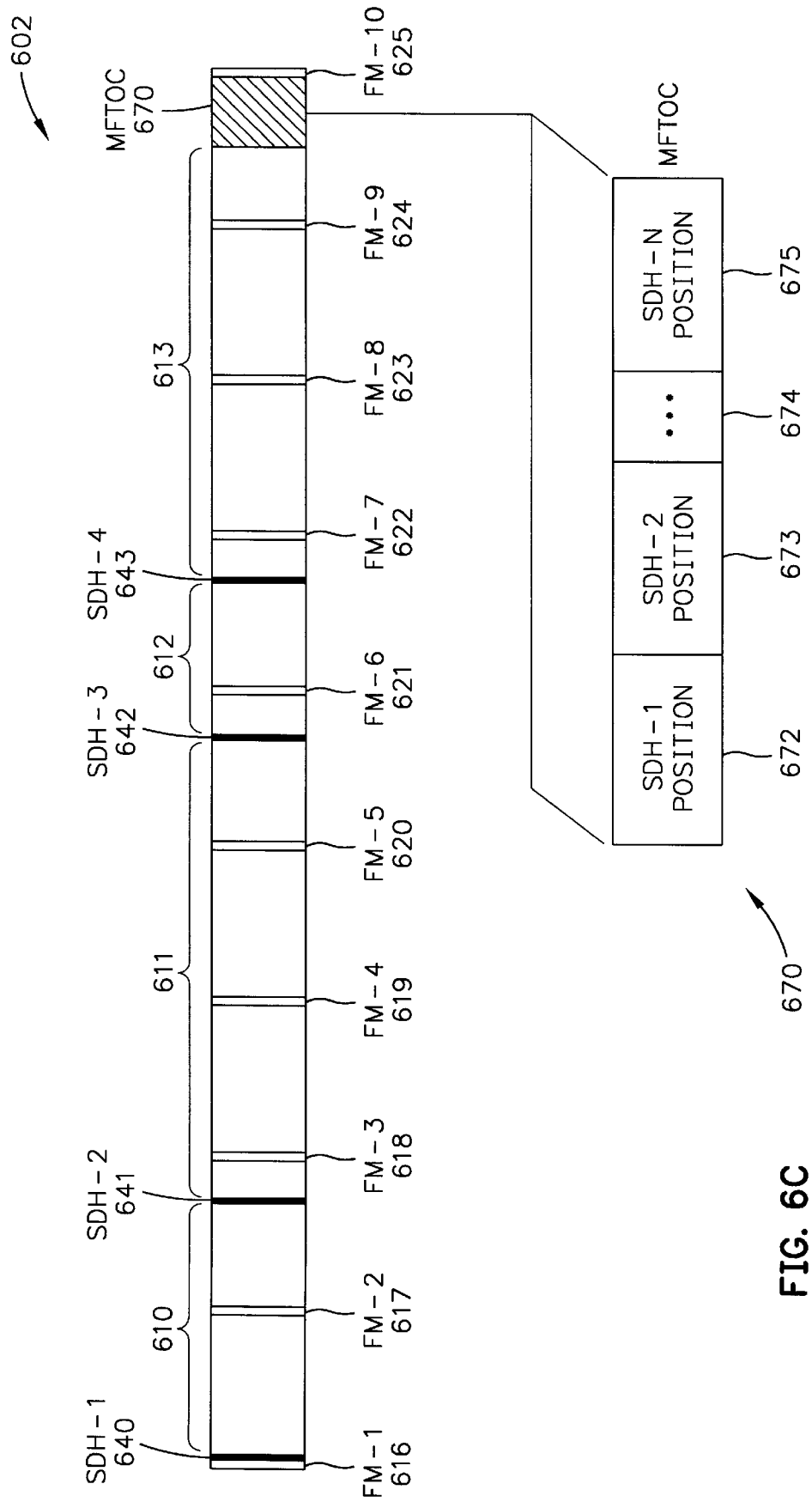

As mentioned above, and shown in FIG. 6C, the managed file 602 is also stored with a managed file table-of-contents 670. The position of the managed file table-of-contents is shown by the frame trailer 625. The table-of-contents 670 includes information indicating the position of each self-describing header 640–643. As shown in the example of FIG. 6C, the table-of-contents is implemented with fields 672–675, each field indicating a position of a different one of the self-describing headers 640–643.

As an example, each position field 672–675 may comprise an offset from the first frame header 616 to a respective self-describing header, an offset from the frame trailer 625, an absolute position, a length of the self-describing header and its corresponding user file, or any other value useful to indicate a position of the respective self-describing header. Preferably, the position fields 672–675 indicate the beginning of their respective sell-describing headers, although a mid-point, end, or another suitable location may be used.

OPERATION

In addition to the various hardware embodiments described above, different aspects of the invention concern methods of storing managed files along with certain embedded codes, and/or reconstructing a lost database that normally contains information about the managed files. These methods are preferably implemented using hardware components such as those disclosed above.

Signal-Bearing Media

More specifically, in the context of FIGS. 1–2 the method aspect of the invention may be implemented, for example, by operating the data processing apparatus 108 (embodied by a digital data processing apparatus 200), to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method of storing managed files along with certain embedded codes, and/or reconstructing a lost database that normally contains information about the managed files.

Figure 3:
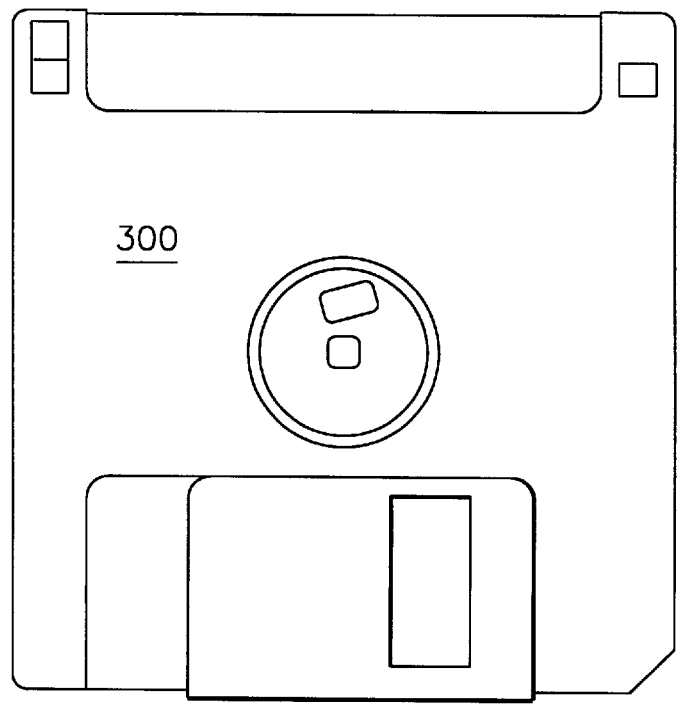
FIG. 3 shows an exemplary signal-bearing medium in accordance with the invention.

Illustratively, this signal-bearing media may comprise RAM (not shown) contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C, C++, PLX, etc.

File Aggregation: General Sequence

Figure 7:
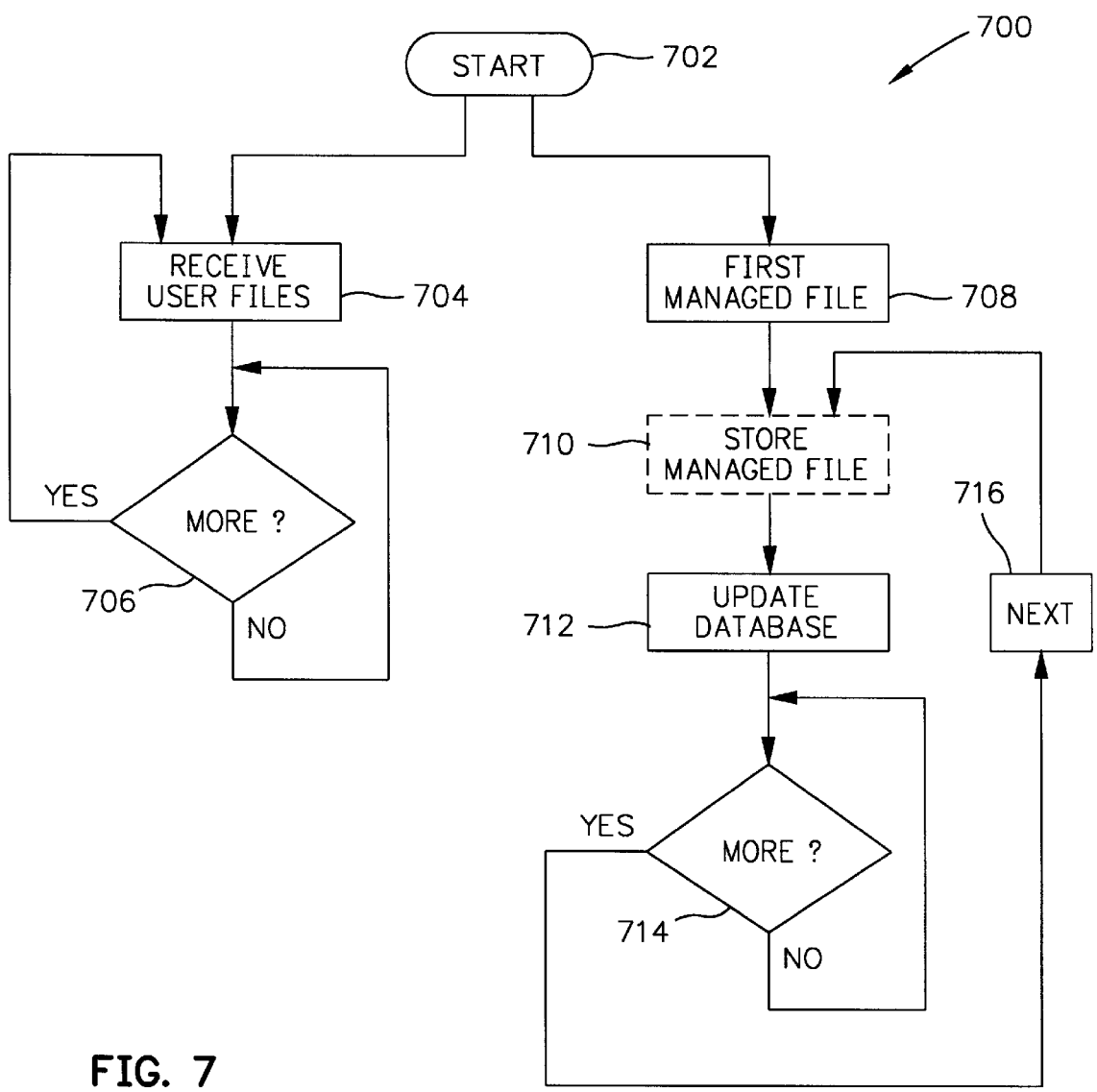
FIG. 7 is a flowchart of an operational sequence for receiving user files and creating managed files therefrom, according to the invention.

FIG. 7 shows an operational sequence 700 to broadly illustrate an exemplary process by which managed files are stored. For ease of explanation, but without any limitation intended thereby, the sequence 700 is described in the context of the hardware environment described above. After the sequence 700 is initiated in step 702, the subsystem 102 continually receives user files from the client stations 106 in steps 704–706.

Concurrently with step 704–706, steps 708–716 create managed files using the received user files. Step 708 starts with a first managed file, making this the "current" managed file. The current managed file is stored in step 710. Storage of the managed file may be performed in a number of different ways. Preferably, user files from each client are stored in separate contiguous regions of the storage hierarchy 114, as the user files are received. These files are stored along with the appropriate frame markers and self-describing headers. Then, when predetermined condition is satisfied for a client, the stored user files are concluded by writing the managed file table-of-contents and frame trailer. The predetermined condition, details of which are discussed below determines how many user files go into the current aggregate file. As an alternative, the user files may be buffered until occurrence of the predetermined condition, at which time the managed file is created by actually storing the user files along with frame markers, self-describing headers, and managed file table-of-contents.

After storing the current managed file in step 710, step 712 updates the database 113 with information about the managed file and its user files. Updating the database 113 has the effect of recognizing the constituent user files as a single managed file. Specifically, step 712 involves updating the database 113 by entering: (1) the user files in the inventory table (Table 1), (2) the managed file in the storage table (Table 2), (3) the managed file and its constituent user files in the mapping table (Table 3), and (4) the managed file in the managed file attributes table (Table 4).

After step 712, step 714 determines whether anymore user files remain. If so, steps 716 initiates storage of the next managed file, making this the "current" managed file.

Laying Down The File Storage Format

Figure 8:
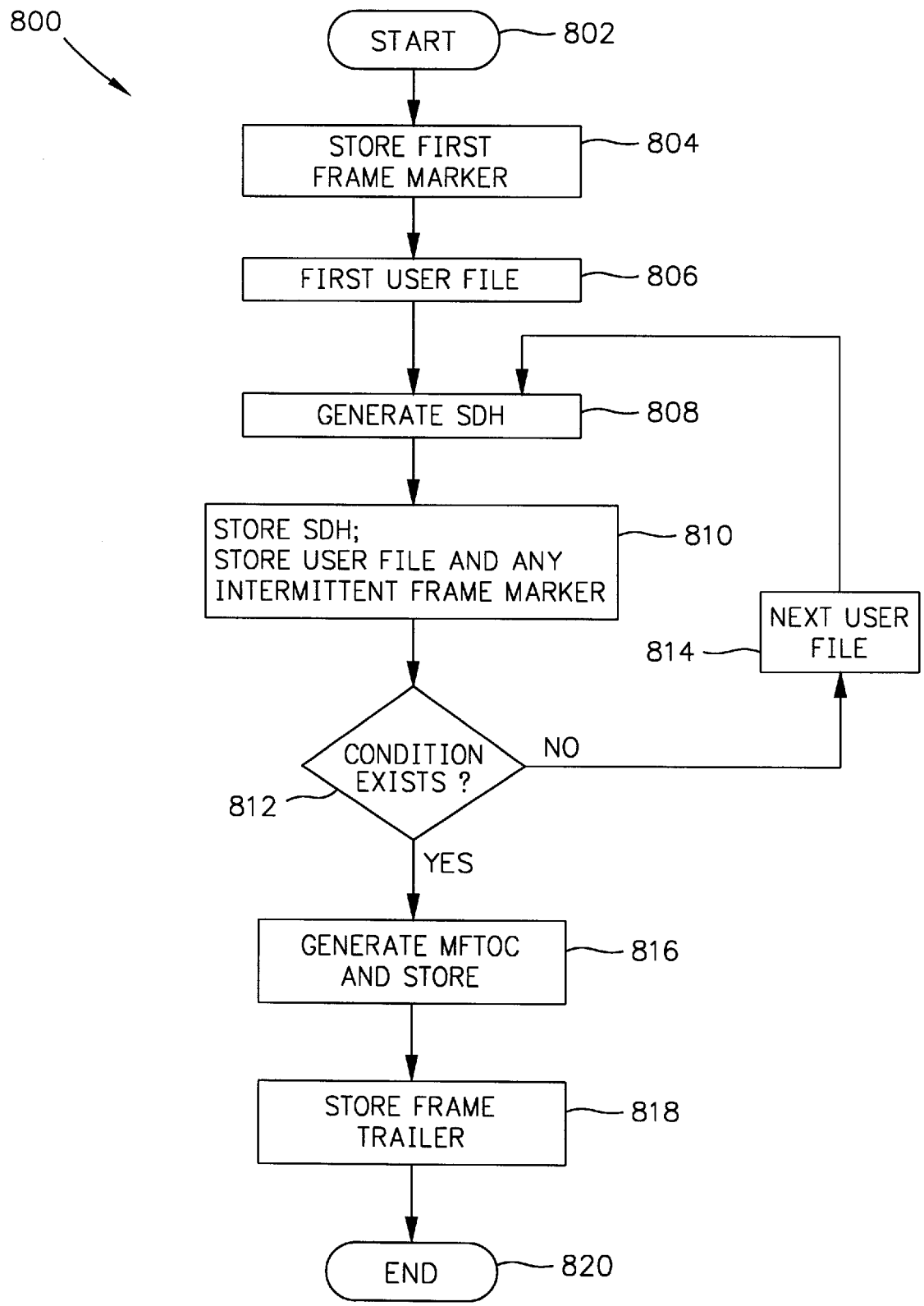
FIG. 8 is a flowchart of an operational sequence for storing of a managed file, including creation of frame marker, self-describing header and table of contents information, in accordance with the invention.

As described above, FIG. 7 shows a process by which managed files are created, including actual storage of the managed file in step 710. FIG. 8 shows an example of a more detailed sequence 800 for storing managed files according to step 710 (FIG. 7). For ease of explanation, but without any limitation intended thereby, the following description of the sequence 800 (FIG. 8) addresses the storage of the managed file 602 (FIG. 6) as an illustrative example, in the context of the hardware environment described above. In this respect, the sequence 800 are preferably executed by the data processing apparatus 108.

Referring to FIGS. 6A–6C and 8, the steps 800 are initiated in step 802, which occurs whenever step 710 of FIG. 7 is performed. After step 802, step 804 begins storage of a new managed file (the "current" managed file) by storing the first frame marker 616. After step 804, step 806 prepares to store a first user file 610 of the managed file 602; this user file is now the "current" user file being processed.

First, step 808 generates the self-describing header 640 for the user file 610. Information for the self-describing header 640 is received, directly or indirectly, from the client station 106 submitting the user file. After step 808, step 810 stores the generated self-describing header 640, the current user file 610, and any intermittent frame markers. In the specific case of the user file 610, there is one intermittent frame marker 617. Preferably, the first self-describing header 640 is stored adjacent to the first frame marker 616, with the user file 610 being adjacent to the header 640. The frame marker 617 is preferably stored within the user file 610 to form a substantially contiguous body.

After step 810, step 812 asks whether a predetermined condition necessary to complete a managed file, is now satisfied. Basically, this condition determines how many user files go into the current managed file being created. If the condition is satisfied, the processing apparatus 108 proceeds to finalize creation of the managed file in steps 816–820. Otherwise, step 814 advances to another user file for storage in steps 808–810.

The predetermined condition of step 812 may be implemented in a number of different ways, depending upon the needs of the application. For example, the condition may comprise receipt (step 704, FIG. 7) of a predetermined number of user files from a particular client station 106. For instance, a managed file may be created for a client by including every ten user files received from that client. In another example, the condition may be specified by a client station 106, which manually identifies desired user files for inclusion into a managed file. In another example, the condition may specify a target managed file size; when enough user files have been received to provide the desired size of managed file, the managed file is completed.

In still another example, the condition may be established to coincide with a "commit transaction". Namely, the subsystem 102 may be implemented, aside from file aggregation, to delay commitment of data storage operations in the storage hierarchy 114 for a group of received user files until occurrence of a predetermined "commit" event. In this case, the predetermined condition of step 812 may be designed to make managed files coincide with each group of user files together committed to storage. Under this arrangement, user files may be written to the storage hierarchy 114 upon receipt, with commitment being effectuated by representing the file in the database 113 (e.g., step 712, FIG. 7).

The condition of step 812 may also consider other factors, for example grouping received user files according to their location within a client station 106. As a further enhancement, the predetermined condition of step 812 may recognize certain types of user files as being appropriate for being the sole user file in a managed file. Moreover, ordinarily skilled artisans (having the benefit of this disclosure) will recognize many completely different criteria suitable for step 812, without departing from the scope of this invention. Such criteria may further involve combinations and/or variations of such different criteria as well as the conditions discussed above.

If the predetermined condition is not satisfied, step 814 considers the next user file pending storage, making this the "current" user file. In the present example, the next user file after the user file 610 is the user file 611. After step 808 generates the self-describing header 641 for the current user file 611, step 810 stores the self-describing header 641 adjacent to the previously stored user file 610. Step 810 also stores the current user file 611 adjacent to the header 641.

Steps 812, 814, 808, and 810 repeat until the predetermined condition is satisfied. Then, step 816 generates the managed file table-of-contents 670 and stores it following the last user file, i.e., the user file 613 in this example. After step 816, step 818 generates the frame trailer 625 and stores it abutting the table-of-contents 670.

After step 818, the routine 800 ends in step 820. Although this ends step 710 (FIG. 7) by completing storage of the managed file 602, entry of the managed file and its constituent user files in the database 113 still remains for performance in step 712 (FIG. 7).

Reconstructing The Failed Database

Figure 9:
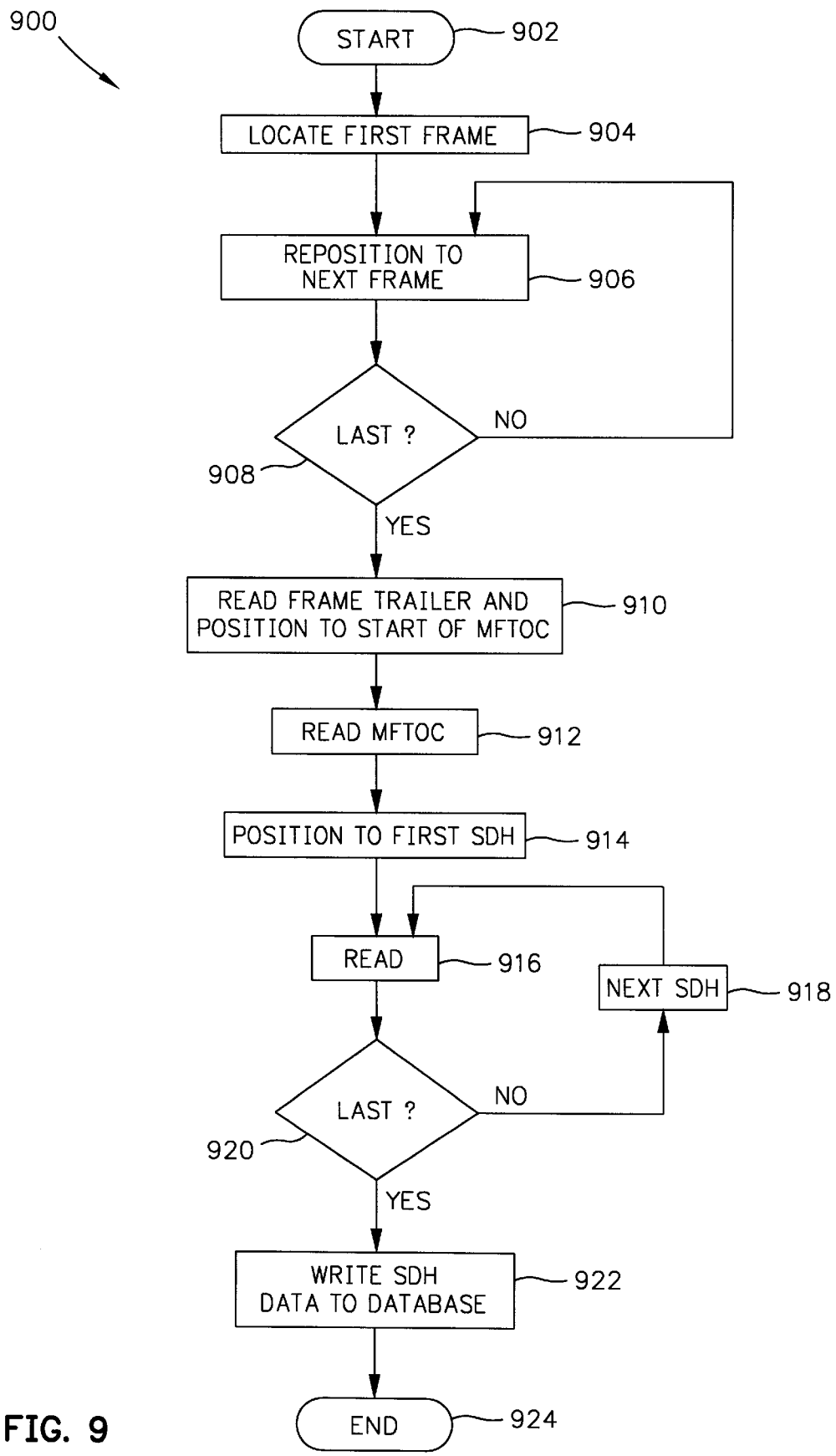
FIG. 9 is a flowchart of an operational sequence for reconstructing a database using information including embedded codes, according to the invention.
Figure 1:
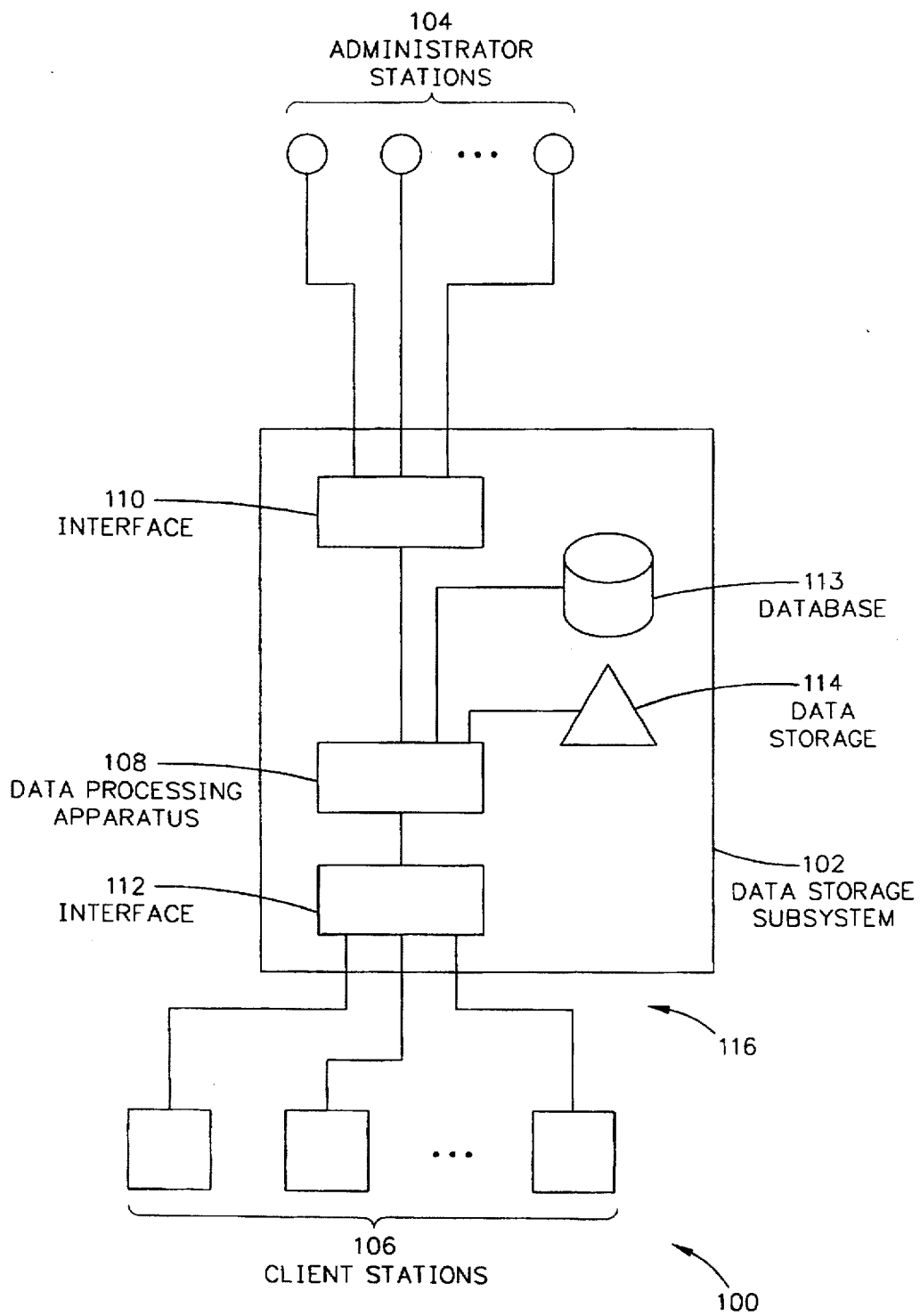
Figure 2:
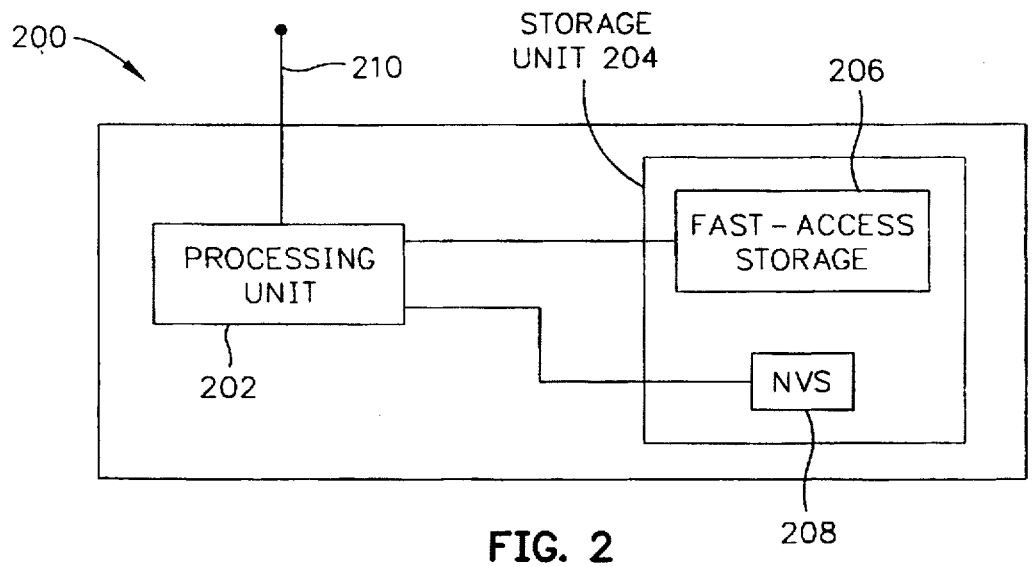
Figure 3:
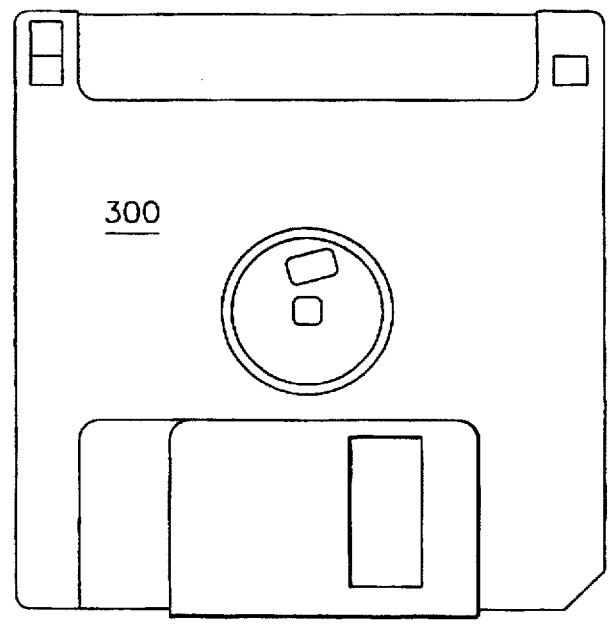
Figure 4:
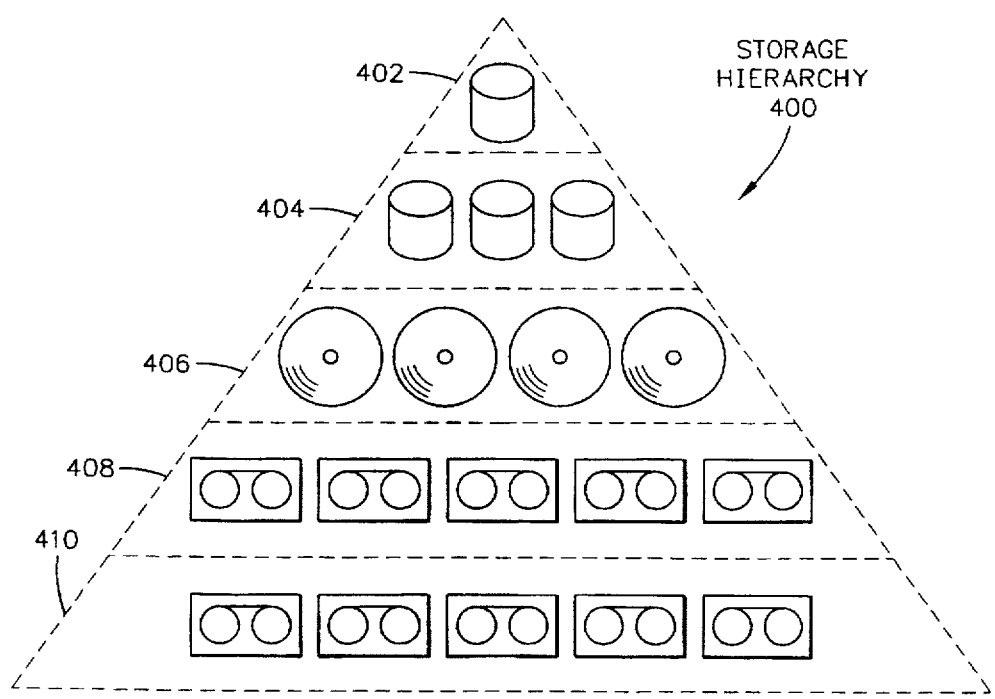
Figure 5:
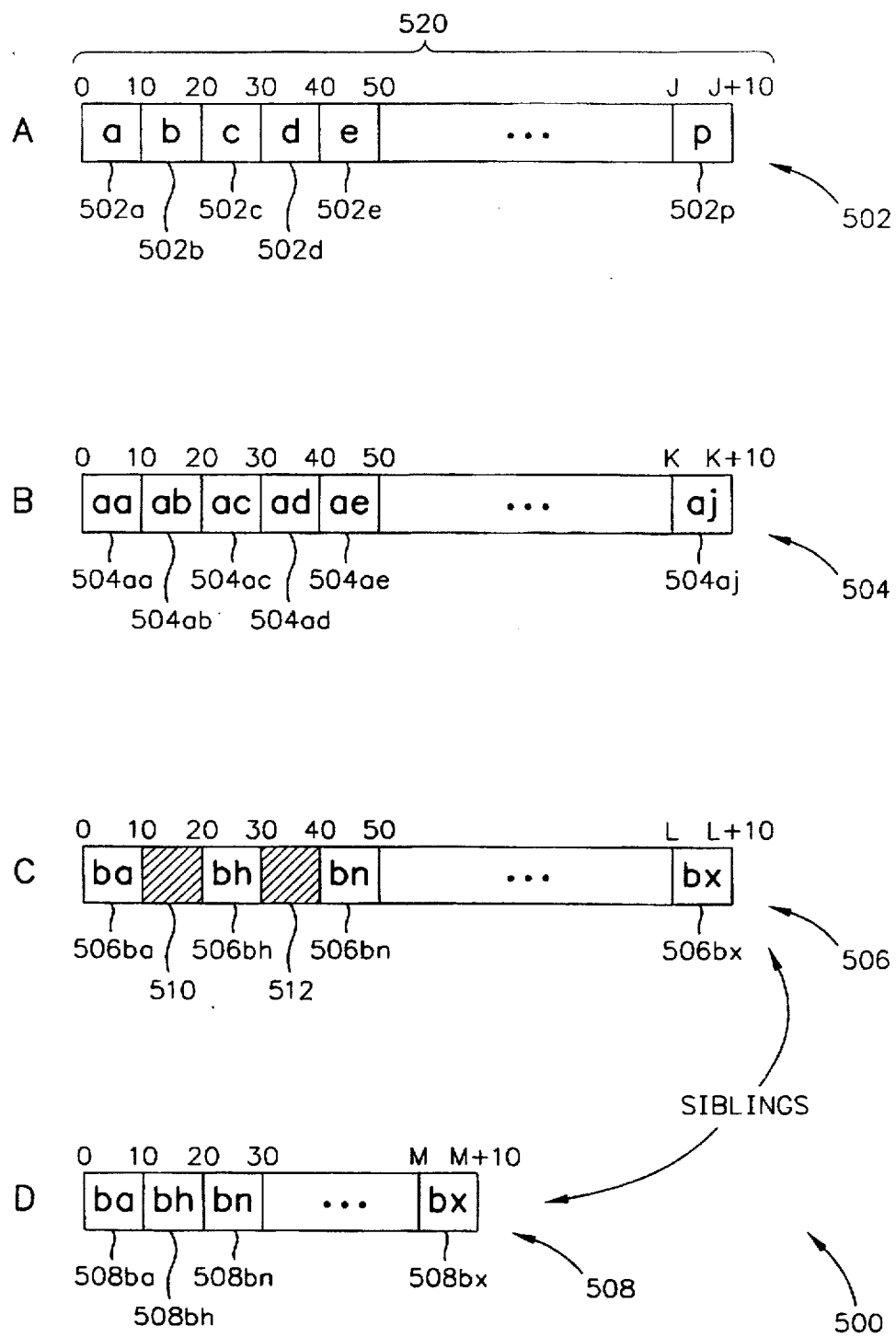
Figure 6A:
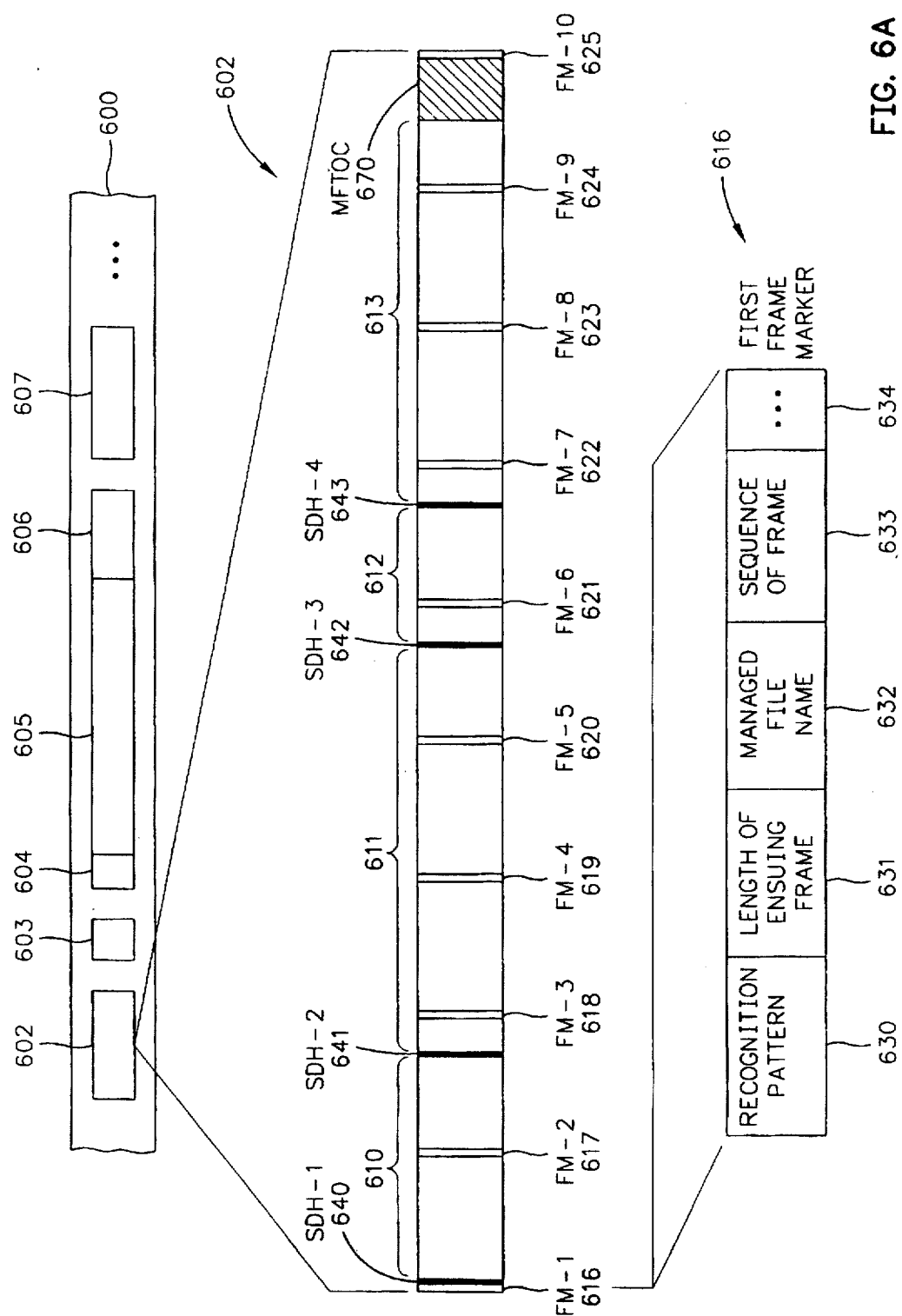
Figure 6B:
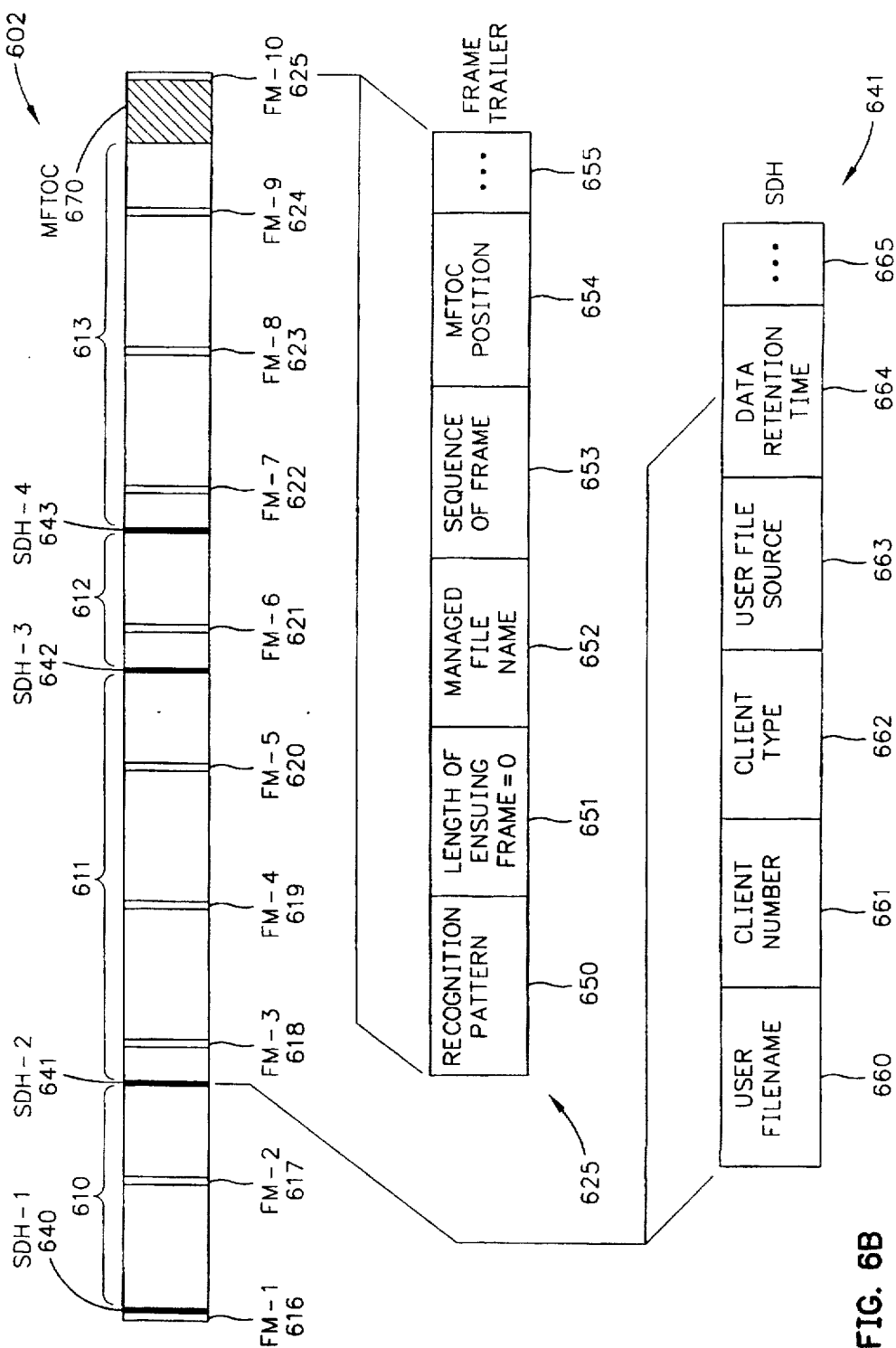
Figure 6C:
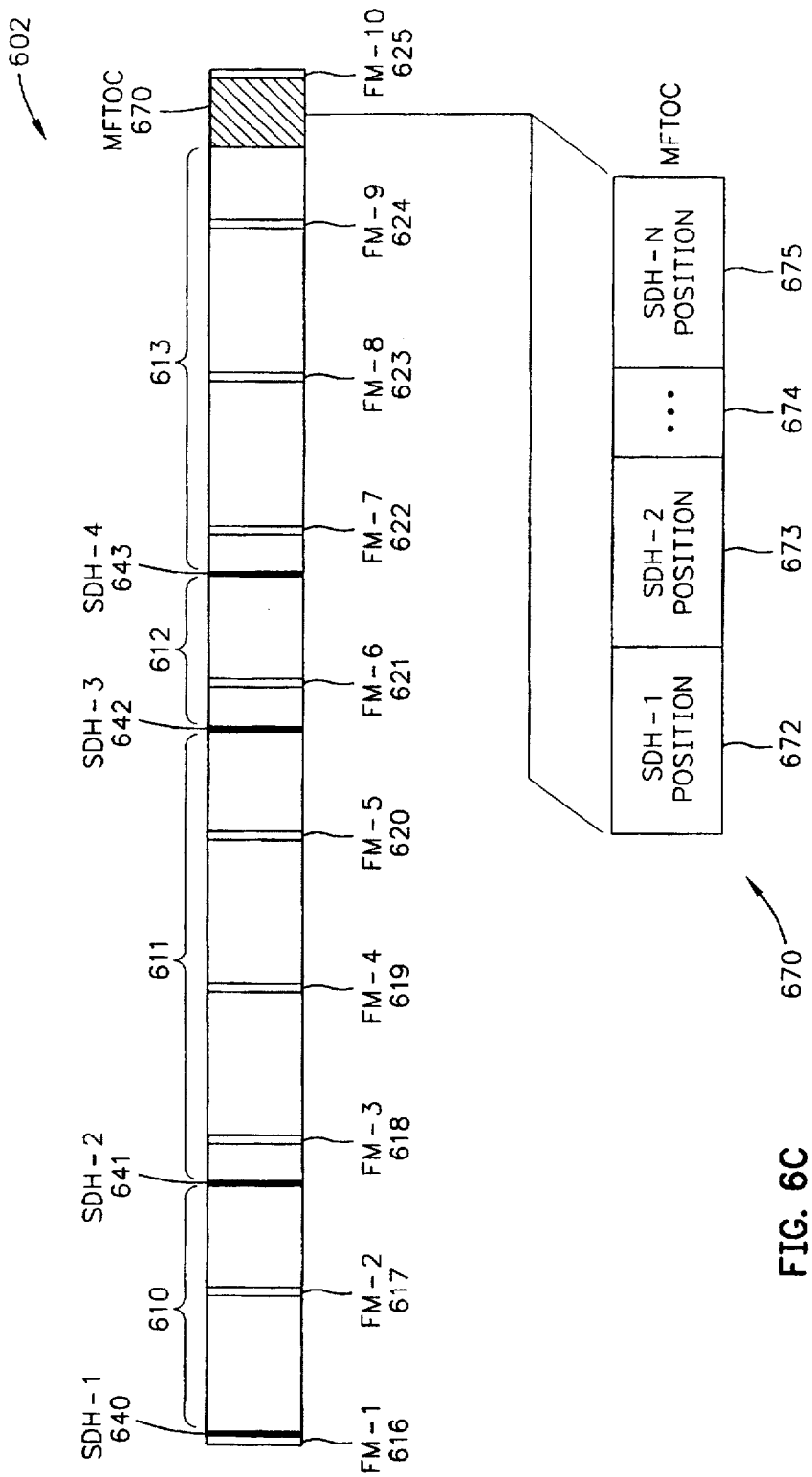
Figure 7:
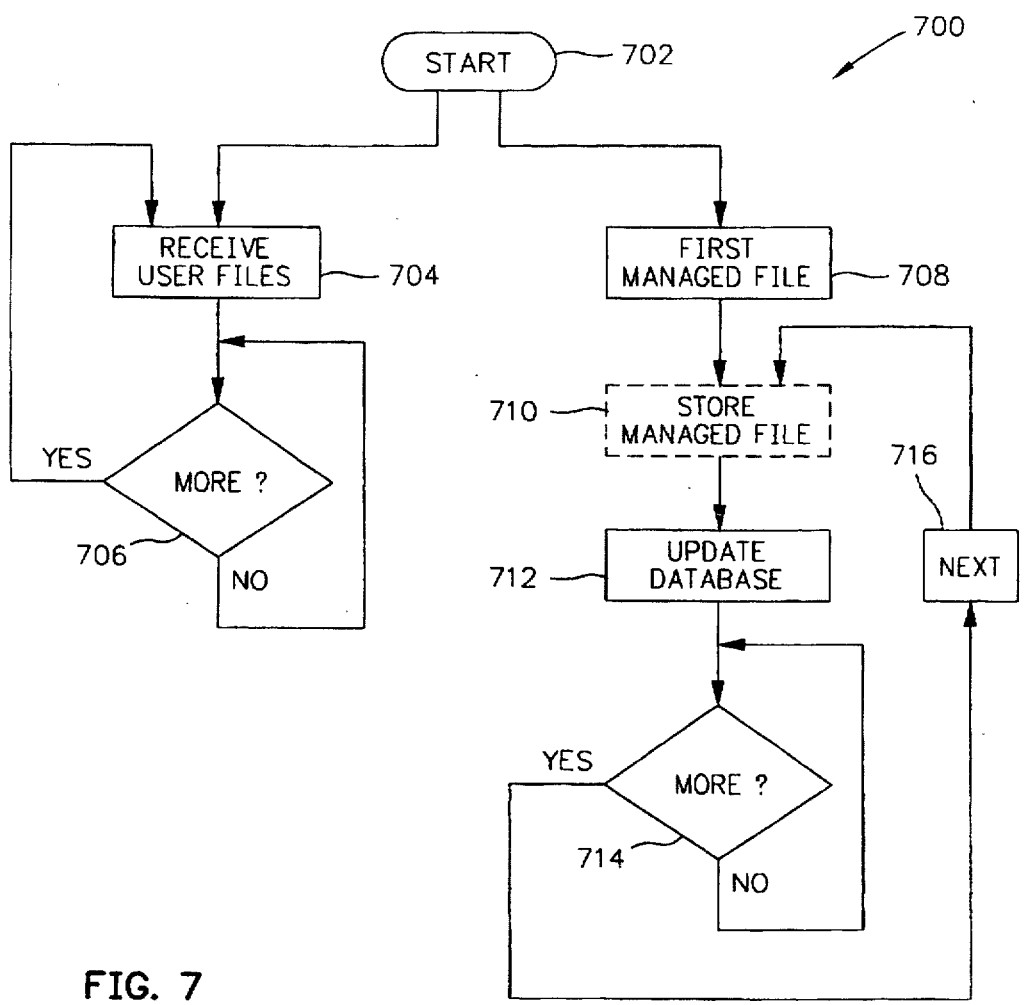
Figure 8:
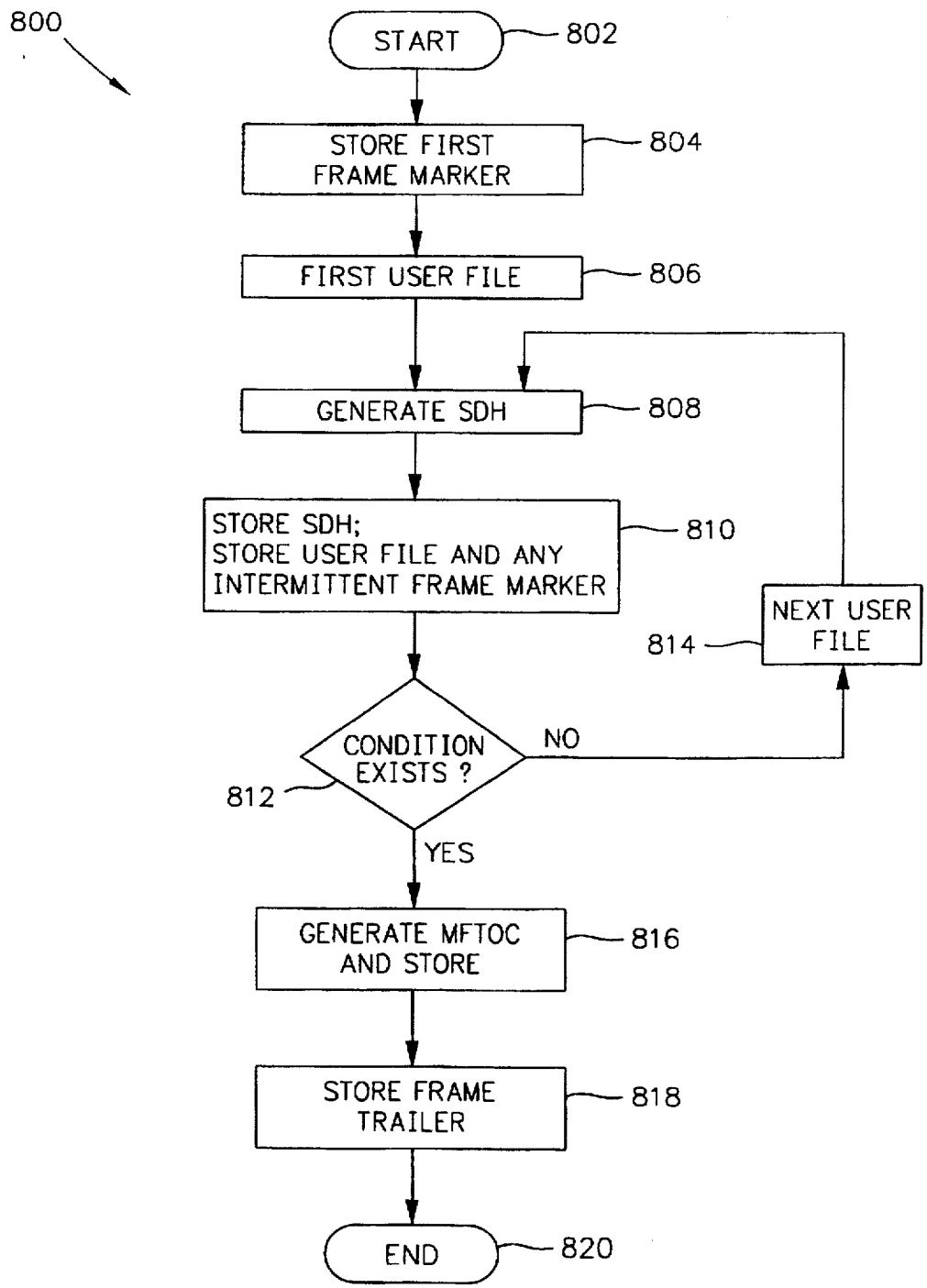
Figure 9:
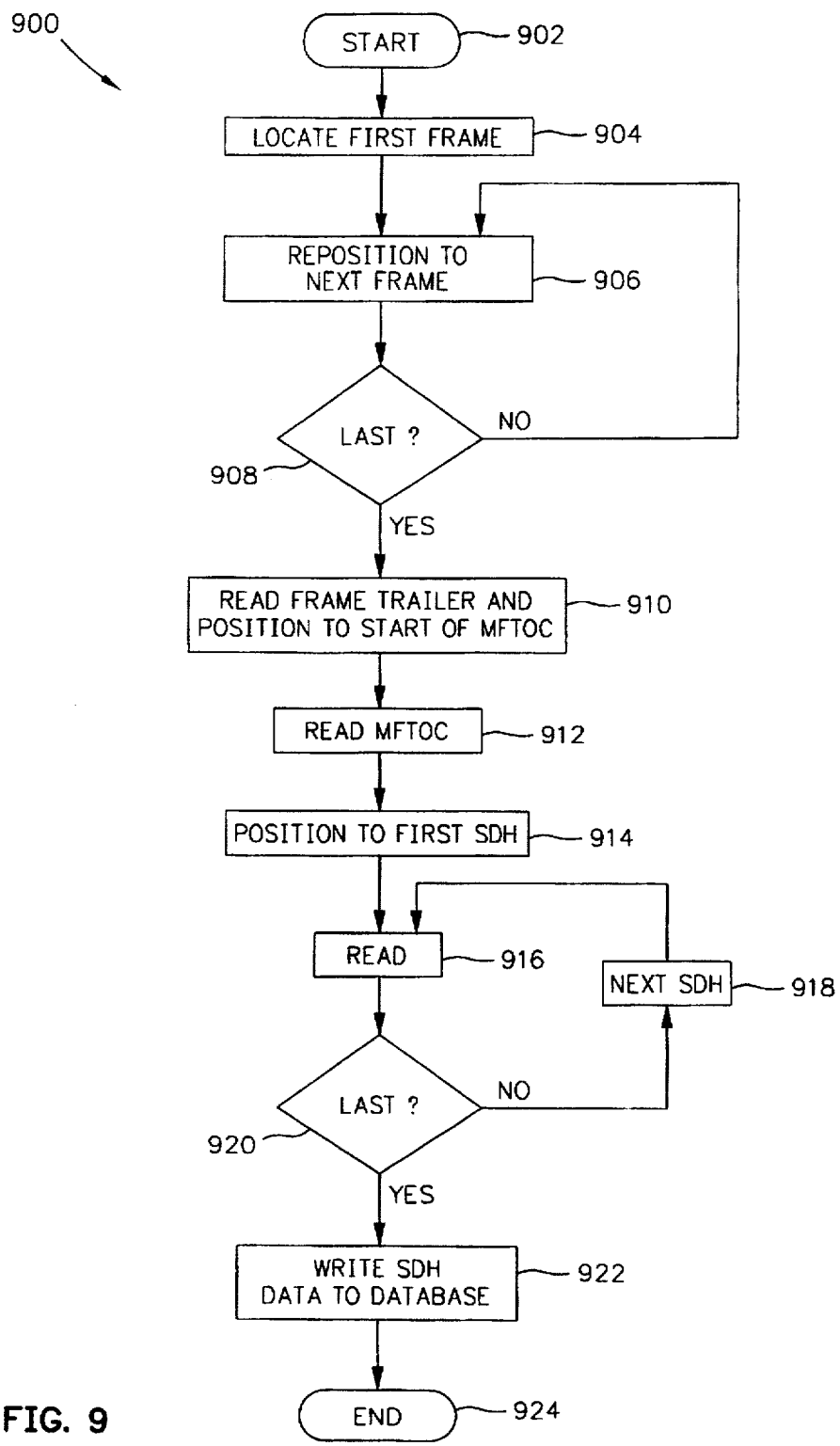

Having stored a managed file, its constituent user files, and the embedded codes as shown above, this information is available for possible reconstruction of the related database entries, should the database 113 fail. This process involves collecting data stored on the storage hierarchy 114, and rewriting this data into a reconstructed version of the database 113. Although this may be performed in various different ways, FIG. 9 shows one exemplary sequence 900. For ease of explanation, but without any limitation intended thereby, the example of FIG. 9 is described in the context of the hardware environment described above. Although many other types of recording media may be used, this example uses magnetic tape 600, as shown in FIGS. 6A–6C, within the storage hierarchy 114, this tape 600 is accessible by a read sensor (not shown) such as a magnetic read/write head or another appropriate device.

As an example, the steps 900 may be initiated in step 902 whenever failure or other loss of the database 113 is detected. After step 902, step 904 advances the read sensor with respect to the tape 600 to locate the first frame. This may be achieved, for example, by directing the read sensor to perform repeated forward or reverse "scan" operations searching for the recognition pattern used by the frame markers, this scanning being continued until a frame marker is found whose sequence (field 633) is one. This procedure effectively locates the first frame marker 616. After step 904, step 906 repositions the read sensor to the next frame, preferably by advancing directly thereto using the length of the current frame (field 631).

Step 908 asks whether this is the last frame (i.e., the frame trailer 625), which is answered in the illustrated example by determining whether the current frame marker's length field (e.g., 651) shows a length of zero. Steps 906 and 908 repeat until the frame trailer 625 is found. After finding the frame trailer 625, step 910 reads the managed file table-of-contents field 654 to determine the table-of-contents' position. As mentioned above, the field 654 preferably indicates a starting point of the managed file table-of-contents 670, preferably as an offset value from the frame trailer 625.

With this information, step 912 positions the read sensor at the start of the table-of-contents, and reads the table-of-contents. As explained above, the table-of-contents indicates the positions of each self-describing header. Using this information, step 916 positions the read sensor at the first self-describing header 640 and reads the information contained therein. Steps 920, 918, and 916 repeat until all self-describing headers have been read. Preferably, the self-describing header information is temporarily accumulated in a buffer (not shown).

After reading the self-describing headers, step 922 writes the collected information into a reconstructed version of the database 113. In one embodiment, step 922 may write this data back to the database 113 itself thus repairing the database 113 intact. In a different embodiment, step 922 may write this data to a different database (not shown), which will ultimately replace the database 113.

With the exemplary database contents described above (i.e., Tables 1–4), step 922 involves updating the inventory, storage, mapping, and managed file attributes tables. To update the inventory table, step 922 chooses a new unique user filename for each user file, and stores this new filename along with the appropriate self-describing header entries. The new filenames are needed to avoid confusion with the old database 113. To update the storage table, a new entry for the current managed file 602 is created using the storage pool, volume, and location at which the managed file 602 is physically found on the tape 600. Step 922 updates the mapping table by inserting the new user filenames in place of their old counterparts, and by generating and storing length and offset information obtained from the managed file table-of-contents 670. One side-effect of restoring the mapping table in this way is that any deleted user files are reinstated. The managed file attributes table is updated by calculating the managed file's (1) number of active files, from the number of entries in the table-of-contents 670, and (2) total size, by subtracting the starting, position of the table-of-contents from the starting position of the first frame marker 616, and also subtracting the sizes of all frame markers.

After reconstructing the database 113 in step 922, the routine 900 ends in step 924.

Using Stored Managed Files

After any managed files have been stored in the storage hierarchy 114 as shown above, these managed files are available for use in satisfying client requests as well as internal data management operations.

Generally, the client requests involve operations involving user files, such as retrieve, delete, restore, etc. Internal data management operations, for example, may involve copying a managed file intact, identifying user files in a managed file, moving a managed file, deleting, a managed file, migrating a managed file, reclaiming unused space in a storage unit, backing up storage pool data, restoring storage pool data, etc.

The foregoing operations are discussed in detail in the following U.S. patent application, which is incorporated by reference in its entirety: U.S. application Ser. No. 08/960,627, entitled "Storage Management System With File Aggregation Supporting Multiple Aggregated File Counterparts", filed on Oct. 29, 1997 in the names of Cannon et al., and assigned to IBM.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

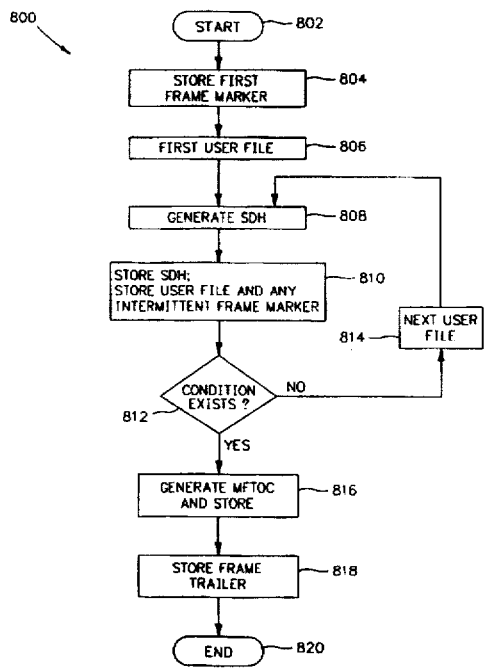

What is claimed is:

1. A method of storing machine-readable data on a data storage medium, the method comprising:
   storing multiple user files in substantially contiguous arrangement, the user files forming a managed file having a managed filename;
   storing multiple self-describing headers, each self-describing header substantially immediately preceding an associated user file and including predetermined information about that user file;
   storing a table-of-contents following a last one of the user files, the table-of-contents containing information representing positions of the self-describing headers; and
   storing multiple frame markers, each including:
      a predetermined recognition pattern;
      the managed filename;
      a sequence indicator representing a sequence of the frame marker relative to other frame markers associated with the managed filename;
      a next-frame locator containing information representing a position of a next frame marker;
      wherein the frame markers are placed at a beginning of the managed file, at an end of the table-of-contents, and within the substantially contiguous arrangement; and
      wherein a final one of the frame markers includes indicia identifying the frame marker as the final one and additionally includes information representing a position of the table-of-contents.

2. The method of claim 1, the storing of the user files, self-describing headers, table-of-contents, and frame markers being performed in an order comprising:
   (a) storing a first one of the frame markers;
   (b) storing a self-describing header adjacent to the frame marker most recently stored and storing a user file adjacent to the self-describing header most recently stored, the user file or self-describing header being interrupted by one or more intervening frame markers;
   (c) repeating step (b) until all user files have been stored, and then:
      storing the table-of-contents substantially adjacent to the user file most recently stored; and
      storing the final frame marker substantially adjacent to the table-of-contents.

3. The method of claim 1, the positions of the self-describing headers comprising offsets from a predetermined storage position.

4. The method of claim 1, the next-frame locator comprising an address of the next frame marker.

5. The method of claim 1, the next-frame locator comprising an offset from a predetermined point on the data storage medium to the next frame marker.

6. The method of claim 1, the next-frame locator of each frame marker comprising a length of storage space between that frame marker and the next frame marker.

7. A method of storing data, comprising:
   (a) receiving multiple user files;
   (b) storing a first managed file, having a first managed filename, comprising:
      (1) generating and storing a first frame marker, the frame marker comprising:
         a predetermined recognition pattern;
         the first managed filename;
         a next-frame locator indicating a location of a second frame marker; and
         a sequence number of the first frame marker;
      (2) generating and storing a self-describing header including predetermined information about a next one of the user files;
      (3) storing the next user file and any intermittent frame markers that occur within the next user file in accordance with a prescribed frame marker pattern;
      (4) repeating steps (2) and (3) for each received user file received until a predetermined condition is satisfied, and thereupon:
         generating and storing a table-of-contents substantially adjacent a last one of the stored user files; and
         storing a frame trailer substantially adjacent the table-of-content, the frame trailer containing information representing a storage position of the table-of-contents.

8. A method for collecting information from source data stored on a recording medium for use in constructing a database describing the data;
   where the source data comprises:
      multiple user files in substantially contiguous arrangement, the user files forming a managed file having a managed filename;
      multiple self-describing headers, each self-describing header substantially immediately preceding an associated user file and including predetermined information about that user file;
      a table-of-contents following a last one of the user files, the table-of-contents containing information representing positions of the self-describing headers; and
      multiple frame markers, each including:
         a predetermined recognition pattern;
         the managed filename;
         a sequence indicator representing a sequence of the frame marker relative to other frame markers associated with the managed filename; and
         a next-frame locator containing information representing a position of a next frame marker;
         wherein the frame markers are placed at a beginning of the managed file, at an end of the table-of-contents, and within the substantially contiguous arrangement;
         wherein a final one of the frame markers includes indicia identifying the frame marker as the final one and additionally includes information representing a position of the table-of-contents;
   the method comprising:
      locating a first one of the frame markers by running a read sensor past the recording medium to scan for the recognition pattern;

finding the final frame marker by repeatedly:
reading a next-frame locator of the frame where the read sensor is positioned, determining a position of the next frame marker using the read next-frame locator, advancing the read sensor to the determined position of the next frame marker, and reading the next frame marker to determine whether this is the final frame marker;
in response to finding the final frame marker:
reading from the final frame marker the information representing the position of the table-of-contents; and
positioning the read sensor at the position of the table-of-contents and reading the table-of-contents including the information representing the positions of the self-describing headers.

9. The method of claim 8, further comprising:
using the information representing the positions of the self-describing headers, individually positioning the read sensor at each self-describing header and reading the information about the user file associated with that self-describing header.

10. The method of claim 9, the method further comprising constructing the database by compiling the information about the user files from each self-describing header and storing the compiled information in a predetermined database format.

11. The method of claim 8, the method further comprising constructing the database, including:
using the information read from the table-of-contents to determine, for each user file in the managed file, the user file's length and the user file's starting position within the managed file relative to other user files; and
writing to the database data associating each user file with its length, its offset, and the managed file.

12. A signal-bearing medium tangibly embodying a program of machine-readable instructions executable by a digital processing apparatus to perform a method for storing machine-readable data on a data storage medium, the method comprising:
storing multiple user files in substantially contiguous arrangement, the user files forming a managed file having a managed filename;
storing multiple self-describing headers, each self-describing header substantially immediately preceding an associated user file and including predetermined information about that user file;
storing a table-of-contents following a last one of the user files, the table-of-contents containing information representing positions of the self-describing headers; and
storing multiple frame markers, each including:
a predetermined recognition pattern;
the managed filename;
a sequence indicator representing a sequence of the frame marker relative to other frame markers associated with the managed filename;
a next-frame locator containing information representing a position of a next frame marker;
wherein the frame markers are placed at a beginning of the managed file, at an end of the table-of-contents, and within the substantially contiguous arrangement; and
wherein a final one of the frame markers includes indicia identifying the frame marker as the final one and additionally includes information representing a position of the table-of-contents.

13. The medium of claim 12, the storing of the user files, self-describing headers, table-of-contents, and frame markers being performed in an order comprising:
(a) storing a first one of the frame markers;
(b) storing a self-describing header adjacent to the frame marker most recently stored and storing a user file adjacent to the self-describing header most recently stored, the user file or self-describing header being interrupted by one or more intervening frame markers;
(c) repeating step (b) until all user files have been stored, and then:
storing the table-of-contents substantially adjacent to the user file most recently stored; and
storing the final frame marker substantially adjacent to the table-of-contents.

14. The medium of claim 12, the positions of the self-describing headers comprising offsets from a predetermined storage position.

15. The medium of claim 12, the next-frame locator comprising an address of the next frame marker.

16. The medium of claim 12, the next-frame locator comprising an offset from a predetermined point on the data storage medium to the next frame marker.

17. The medium of claim 12, the next-frame locator of each frame marker comprising a length of storage space between that frame marker and the next frame marker.

18. A signal-bearing medium tangibly embodying a program of machine-readable instructions executable by a digital processing apparatus to perform a method for storing data, the method comprising:
(a) receiving multiple user files;
(b) storing a first managed file, having a first managed file name, comprising:
(1) generating and storing a first frame marker, the frame marker comprising:
a predetermined recognition pattern;
the first managed filename;
a next-frame locator indicating a location of a second frame marker; and
a sequence number of the first frame marker;
(2) generating and storing a self-describing header including predetermined information about a next one of the user files;
(3) storing the next user file and any intermittent frame markers that occur within the next user file in accordance with a prescribed frame marker pattern;
(4) repeating steps (2) and (3) for each received user file received until a predetermined condition is satisfied, and thereupon:
generating and storing a table-of-contents substantially adjacent a last one of the stored user files; and
storing a frame trailer substantially adjacent the table-of-content, the frame trailer containing information representing a storage position of the table-of-contents.

19. A signal-bearing medium tangibly embodying a program of machine-readable instructions executable by a digital processing apparatus to perform a method for collecting self-describing information from source data stored on a recording medium for use in constructing a database describing the data, where the source data comprises:
multiple user files in substantially contiguous arrangement, the user files forming a managed file having a managed filename;
multiple self-describing headers, each self-describing header substantially immediately preceding an associated user file and including predetermined information about that user file;
a table-of-contents following a last one of the user files, the table-of-contents containing information representing positions of the self-describing headers; and
multiple frame markers, each including:
  a predetermined recognition pattern;
  the managed filename;
  a sequence indicator representing a sequence of the frame marker relative to other frame markers associated with the managed filename; and
  a next-frame locator containing information representing a position of a next frame marker;
  wherein the frame markers are placed at a beginning of the managed file, at an end of the table-of-contents, and within the substantially contiguous arrangement;
  wherein a final one of the frame markers includes indicia identifying the frame marker as the final one and additionally includes information representing a position of the table-of-contents;
the method comprising:
  locating a first one of the frame markers by running a read sensor past the recording medium to scan for the recognition pattern;
  finding the final frame marker by repeatedly:
    reading a next-frame locator of the frame where the read sensor is positioned, determining a position of the next frame marker using the read next-frame locator, advancing the read sensor to the determined position of the next frame marker, and reading the next frame marker to determine whether this is the final frame marker;
  in response to finding the final frame marker:
    reading from the final frame marker the information representing the position of the table-of-contents; and
    positioning the read sensor at the position of the table-of-contents and reading the table-of-contents including the information representing the positions of the self-describing headers.

20. The medium of claim 19, the method further comprising:
using the information representing the positions of the self-describing headers, individually positioning the read sensor at each self-describing header and reading the information about the user file associated with that self-describing header.

21. The medium of claim 20, the method further comprising constructing the database by compiling, the information about the user files from each self-describing header and storing the compiled information in a predetermined database format.

22. The medium of claim 19, the method further comprising constructing the database, including:
using the information read from the table-of-contents to determine, for each user file in the managed file, the user file's length and the user file's starting position within the managed file relative to other user files; and
writing to the database data associating each user file with its length, its offset, and the managed file.

23. A data storage subsystem, comprising:
a data storage;
a digital data processor, programmed to perform a method of storing machine-readable data on a data storage medium, the method comprising:
  storing multiple user files in substantially contiguous arrangement, the user files forming a managed file having a managed filename;
  storing multiple self-describing headers, each self-describing header substantially immediately preceding an associated user file and including predetermined information about that user file;
  storing a table-of-contents following a last one of the user files, the table-of-contents containing information representing positions of the self-describing headers; and
  storing multiple frame markers, each including:
    a predetermined recognition pattern;
    the managed filename;
    a sequence indicator representing a sequence of the frame marker relative to other frame markers associated with the managed filename;
    a next-frame locator containing information representing a position of a next frame marker;
    wherein the frame markers are placed at a beginning of the managed file, at an end of the table-of-contents, and within the substantially contiguous arrangement; and
    wherein a final one of the frame markers includes indicia identifying the frame marker as the final one and additionally includes information representing a position of the table-of-contents.

24. The subsystem of claim 23, the storing of the user files, self-describing headers, table-of-contents, and frame markers being performed in an order comprising:
  (a) storing a first one of the frame markers;
  (b) storing a self-describing header adjacent to the frame marker most recently stored and storing a user file adjacent to the self-describing header most recently stored, the user file or self-describing header being interrupted by one or more intervening frame markers;
  (c) repeating, step (b) until all user files have been stored, and then:
    storing the table-of-contents substantially adjacent to the user file most recently stored; and
    storing the final frame marker substantially adjacent to the table-of-contents.

25. The subsystem of claim 24, the positions of the self-describing headers comprising offsets from a predetermined storage position.

26. The subsystem of claim 24, the next-frame locator comprising an address of the next frame marker.

27. The subsystem of claim 24, the next-frame locator comprising an offset from a predetermined point on the data storage medium to the next frame marker.

28. The subsystem of claim 24, the next-frame locator of each frame marker comprising a length of storage space between that frame marker and the next frame marker.

29. A data storage subsystem, comprising:
a data storage;
a digital data processor, programmed to perform a method of storing data, the method comprising:
  (a) receiving multiple user files;
  (b) storing a first managed file, having a first managed filename, comprising:
    (1) generating and storing a first frame marker, the frame marker comprising:
      a predetermined recognition pattern;
      the first managed filename;
      a next-frame locator indicating a location of a second frame marker; and
      a sequence number of the first frame marker;
    (2) generating and storing a self-describing header including predetermined information about a next one of the user files;

(3) storing the next user file and any intermittent frame markers that occur within the next user file in accordance with a prescribed frame marker pattern;

(4) repeating steps (2) and (3) for each received user file received until a predetermined condition is satisfied, and thereupon:

generating and storing a table-of-contents substantially adjacent a last one of the stored user files; and storing a frame trailer substantially adjacent the table-of-content, the frame trailer containing information representing a storage position of the table-of-contents.

30. A data storage subsystem, comprising:

a data storage containing source data, including:

multiple user files in substantially contiguous arrangement, the user files forming a managed file having a managed filename;

multiple self-describing headers, each self-describing header substantially immediately preceding an associated user file and including predetermined information about that user file;

a table-of-contents following a last one of the user files, the table-of-contents containing information representing positions of the self-describing headers; and multiple frame markers, each including:

a predetermined recognition pattern;

the managed filename;

a sequence indicator representing a sequence of the frame marker relative to other frame markers associated with the managed filename; and a next-frame locator containing information representing a position of a next frame marker;

wherein the frame markers are placed at a beginning of the managed file, at an end of the table-of-contents, and within the substantially contiguous arrangement;

wherein a final one of the frame markers includes indicia identifying the frame marker as the final one and additionally includes information representing a position the table-of-contents;

the method comprising:

locating a first one of the frame markers by running a read sensor past the recording medium to scan for the recognition pattern;

finding the final frame marker by repeatedly:

reading a next-frame locator of the frame where the read sensor is positioned, determining a position of the next frame marker using the read next-frame locator, advancing the read sensor to the determined position of the next frame marker, and reading the next frame marker to determine whether this is the final frame marker;

in response to finding the final frame marker:

reading from the final frame marker the information representing the position of the table-of-contents; and positioning the read sensor at the position of the table-of-contents and reading the table-of-contents including the information representing the positions of the self-describing headers.

31. The subsystem of claim 30, further comprising:

using the information representing the positions of the self-describing headers, individually positioning the read sensor at each self-describing header and reading the information about the user file associated with that self-describing header.

32. The subsystem of claim 30, the method further comprising constructing the database by compiling the information about the user files from each self-describing header and storing the compiled information in a predetermined database format.

33. The subsystem of claim 30, the method further comprising constructing the database, including:

using the information read from the table-of-contents to determine, for each user file in the managed file, the user file's length and the user file's starting position within the managed file relative to other user files; and writing to the database data associating each user file with its length, its offset, and the managed file.

34. A data storage subsystem, comprising:

a data storage means;

a digital data processing means for storing machine-readable data on a data storage medium, by:

storing multiple user files in substantially contiguous arrangement, the user files forming a managed file having a managed filename;

storing multiple self-describing headers, each self-describing header substantially immediately preceding an associated user file and including predetermined information about that user file;

storing a table-of-contents following a last one of the user files, the table-of-contents containing information representing positions of the self-describing headers; and storing multiple frame markers, each including:

a predetermined recognition pattern;

the managed filename;

a sequence indicator representing a sequence of the frame marker relative to other frame markers associated with the managed filename;

a next-frame locator containing information representing a position of a next frame marker;

wherein the frame markers are placed at a beginning of the managed file, at an end of the table-of-contents, and within the substantially contiguous arrangement; and wherein a final one of the frame markers includes indicia identifying the frame marker as the final one and additionally includes information representing a position of the table-of-contents.

35. A data storage subsystem, comprising:

a data storage means;

a digital data processing means for storing data, by:

(a) receiving multiple user files;

(b) storing a first managed file, having a first managed filename, comprising:

(1) generating and storing a first frame marker, the frame marker comprising:

a predetermined recognition pattern;

the first managed filename;

a next-frame locator indicating a location of a second frame marker; and a sequence number of the first frame marker;

(2) generating and storing a self-describing header including predetermined information about a next one of the user files;

(3) storing the next user file and any intermittent frame markers that occur within the next user file in accordance with a prescribed frame marker pattern;

(4) repeating steps (2) and (3) for each received user file received until a predetermined condition is satisfied, and thereupon:

generating and storing a table-of-contents substantially adjacent a last one of the stored user files; and storing a frame trailer substantially adjacent the table-of-content, the frame trailer containing information representing a storage position of the table-of-contents.

36. A data storage subsystem, comprising:
a means for storing source data that includes:
multiple user files in substantially contiguous arrangement, the user files forming a managed file having a managed filename;
multiple self-describing headers, each self-describing header substantially immediately preceding an associated user file and including predetermined information about that user file;
a table-of-contents following a last one of the user files the, table-of-contents containing information representing positions of the self-describing headers; and
multiple frame markers, each including:
a predetermined recognition pattern;
the managed filename;
a sequence indicator representing a sequence of the frame marker relative to other frame markers associated with the managed filename; and
a next-frame locator containing information representing a position of a next frame marker;
wherein the frame markers are placed at a beginning of the managed file, at an end of the table-of-contents, and within the substantially contiguous arrangement;
wherein a final one of the frame markers includes indicia identifying the frame marker as the final one and additionally includes information representing a position of the table-of-contents;
the method comprising:
locating a first one of the frame markers by running a read sensor past the recording medium to scan for the recognition pattern;
finding the final frame marker by repeatedly:
reading a next-frame locator of the frame where the read sensor is positioned, determining a position of the next frame marker using the read next-frame locator, advancing the read sensor to the determined position of the next frame marker, and reading the next frame marker to determine whether this is the final frame marker;
in response to finding the final frame marker:
reading from the final frame marker the information representing the position of the table-of-contents; and
positioning the read sensor at the position of the table-of-contents and reading the table-of-contents including the information representing the positions of the self-describing headers.

37. The data storage subsystem of claim 36, the digital data processing means further constructing the database, by:
using the information read from the table-of-contents to determine, for each user file in the managed file, the user file's length and the user file's starting position within the managed file relative to other user files; and
writing to the database data associating each user file with its length, its offset, and the managed file.

38. An article of manufacture comprising:
a data storage medium;
machine-readable digital data tangibly embodied by the data storage medium the data including:
a managed file, having a managed filename, the managed file comprising multiple user files stored in a substantially contiguous arrangement;
multiple self-describing headers each self-describing header substantially immediately preceding an associated user file and including predetermined information about that user file;
a table-of-contents following a last one of the user files, the table-of-contents containing information representing positions of the self-describing headers; and
multiple frame markers, each including:
a predetermined recognition pattern;
the managed filename;
a sequence indicator representing a sequence of the frame marker relative to other frame markers associated with the managed filename;
a next-frame locator containing information representing a position of a next frame marker;
wherein the frame markers are placed at a beginning of the managed file, at an end of the table-of-contents and within the substantially contiguous arrangement; and
wherein a final one of the frame markers includes indicia identifying the frame marker as the final one and additionally includes information representing a position of the table-of-contents.

39. The article of claim 38, the medium comprising magnetic tape.

40. The article of claim 38, the medium comprising one or more magnetic disk surfaces.

41. The article of claim 38, the storing of the user files, self-describing headers, table-of-contents, and frame markers being performed in an order comprising:
(a) storing a first one of the frame markers;
(b) storing a self-describing header adjacent to the frame marker most recently stored and storing a user file adjacent to the self-describing header most recently stored, the user file or self-describing header being interrupted by one or more intervening frame markers;
(c) repeating step (b) until all user files have been stored, and then:
storing the table-of-contents substantially adjacent to the user file most recently stored; and
storing the final frame marker substantially adjacent to the table-of-contents.

42. The article of claim 38, the positions of the self-describing headers comprising offsets from a predetermined storage position.

43. The article of claim 38, the next-frame locator comprising an address of the next frame marker.

44. The article of claim 38, the next-frame locator comprising an offset from a predetermined point on the data storage medium to the next frame marker.

45. The article of claim 38, the next-frame locator of each frame marker comprising a length of storage space between that frame marker and the next frame marker.

46. An article of manufacture, prepared by a process comprising:
forming a digital data storage medium;
storing multiple user files upon the medium in substantially contiguous arrangement, the user files forming a managed file having a managed filename;
storing multiple self-describing headers upon the medium, each self-describing header substantially immediately preceding an associated user file and including predetermined information about that user file;

storing a table-of-contents upon the medium following a last one of the user files, the table-of-contents containing information representing positions of the self-describing headers; and storing multiple frame markers upon the medium, each including:
  a predetermined recognition pattern;
  the managed filename; and
  a sequence indicator representing a sequence of the frame marker relative to other frame markers associated with the managed filename;
  a next-frame locator containing information representing a position of a next frame marker;
  wherein the frame markers are placed at a beginning of the managed file, at an end of the table-of-contents, and within the substantially contiguous arrangement; and
  wherein a final one of the frame markers includes indicia identifying the frame marker as the final one and additionally includes information representing a position of the table-of-contents.

47. The article of claim 46, the storing of the user files, self-describing headers, table-of-contents, and frame markers being performed in an order comprising:
  (a) storing a first one of the frame markers;
  (b) storing a self-describing header adjacent to the frame marker most recently stored and storing a user file adjacent to the self-describing header most recently stored, the user file or self-describing header being interrupted by frame markers,
  (c) repeating step (b) until all user files have been stored, and then:
    storing the table-of-contents substantially adjacent to the user file most recently stored; and
    storing the final frame marker substantially adjacent to the table-of-contents.

48. The article of claim 46, the positions of the self-describing headers comprising offsets from a predetermined storage position.

49. The article of claim 46, the next-frame locator comprising an address of the next frame marker.

50. The article of claim 46, the next-frame locator comprising an offset from a predetermined point on the data storage medium to the next frame marker.

51. The article of claim 46, the next-frame locator of each frame marker comprising a length of storage space between that frame marker and the next frame marker.

52. An article of manufacture, prepared by a process comprising:
  forming a digital data storage medium;
  storing data on the medium, comprising:
    (a) receiving multiple user files;
    (b) storing a first managed file, having a first managed filename, comprising:
      (1) generating and storing a first frame marker, the frame marker comprising:
        a predetermined recognition pattern;
        the first managed filename;
        a next-frame locator indicating a location of a second frame marker; and
        a sequence number of the first frame marker;
      (2) generating and storing a self-describing header including predetermined information about a next one of the user files;
      (3) storing the next user file and any intermittent frame markers that occur within the next user file in accordance with a prescribed frame marker pattern;
      (4) repeating steps (2) and (3) for each received user file received until a predetermined condition is satisfied, and thereupon:
        generating and storing a table-of-contents substantially adjacent a last one of the stored user files; and
        storing a frame trailer substantialliy adjacent the table-of-content, the frame trailer containing information representing a storage position of the table-of-contents.

* * * * *

UNITED STATES PATENT AND TRADEMARK OFFICE
CERTIFICATE OF CORRECTION

PATENT : 5,963,961

DATED : October 5, 1999

INVENTOR(S) : David Maxwell Cannon, et al.

It is certified that error appears in the above-identified patent and that said Letters Patent is hereby corrected as shown below:

On the title page, "52" Claims, 10 Drawing Sheets" should read --52 Claims, 11 Drawing Sheets--, as shown on the attached title page.

Figure 10:
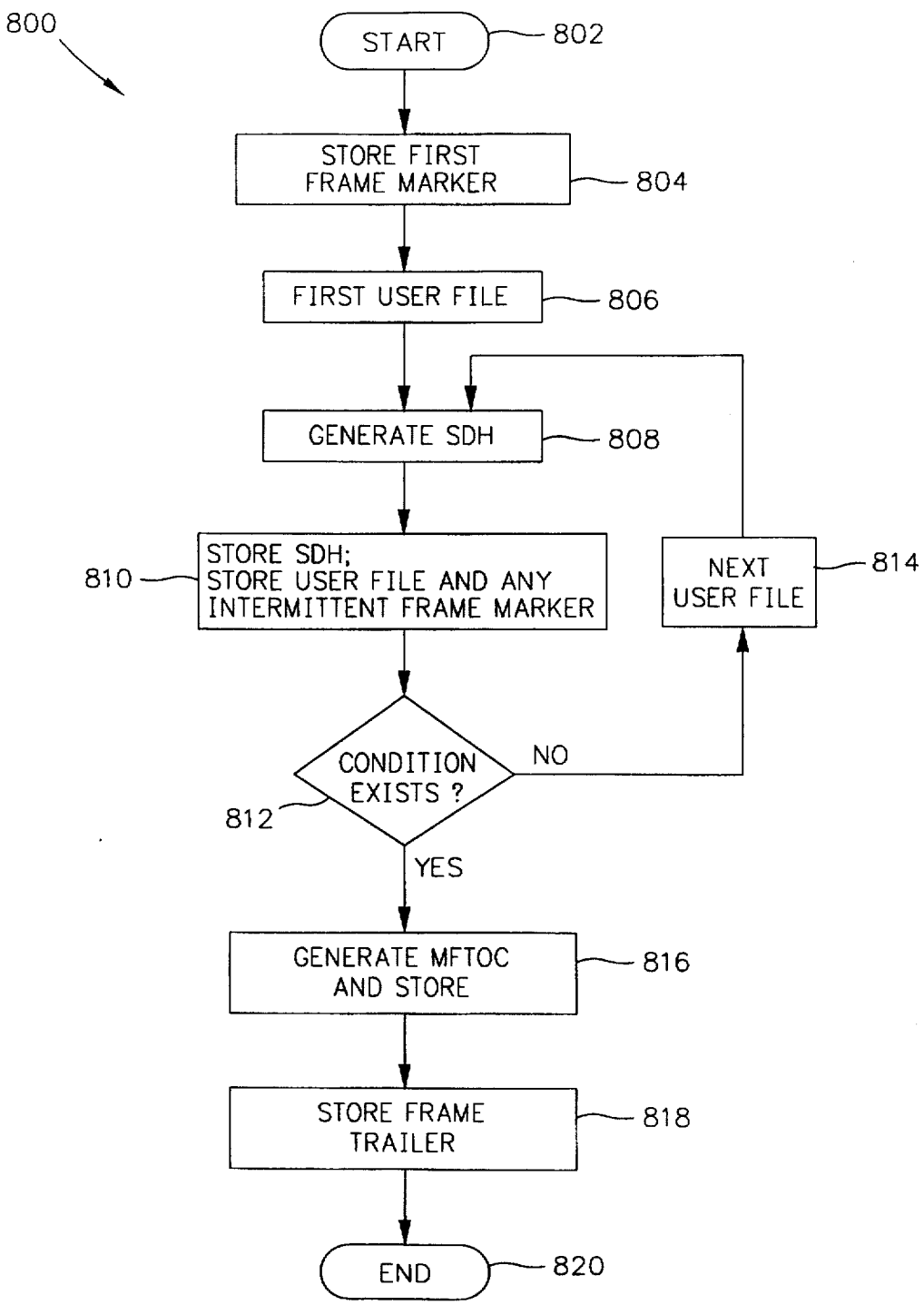

Change the number of Drawing Sheets shown on each Drawing Sheet from "10" to --11--, and add Drawing Sheet 11 of 11, consisting of FIG. 10, as shown on the attached pages.

Signed and Sealed this

Fourth Day of April, 2000

Attest:

Attesting Officer

Q. TODD DICKINSON

Director of Patents and Trademarks

United States Patent [19]
Cannon et al.

[11] Patent Number: 5,963,961
[45] Date of Patent: Oct. 5, 1999

[54] DATABASE RECONSTRUCTION USING EMBEDDED DATABASE BACKUP CODES

[75] Inventors: David Maxwell Cannon; Kenneth Eugene Hannigan; Howard Newton Martin, all of Tucson, Ariz.

[73] Assignee: International Business Machines Corporation, Armonk, N.Y.

[21] Appl. No.: 08/978,526

[22] Filed: Nov. 25, 1997

[51] Int. Cl.$^6$ ........................................................ G06F 17/30
[52] U.S. Cl. ........................ 707/202; 707/200; 395/182.13
[58] Field of Search ........................... 395/180, 182.13, 395/182.03; 707/200, 202

[56] References Cited

U.S. PATENT DOCUMENTS

| | | | |
|---|---|---|---|
| 5,511,190 | 4/1996 | Sharma et al. | 707/1 |
| 5,511,191 | 4/1996 | de Leeuw van Weenen et al. | 707/100 |
| 5,517,645 | 5/1996 | Stutz et al. | 395/680 |
| 5,574,906 | 11/1996 | Morris | 707/1 |
| 5,592,669 | 1/1997 | Robinson et al. | 707/206 |
| 5,619,689 | 4/1997 | Kelly | 707/201 |
| 5,813,017 | 9/1998 | Morris | 707/204 |

OTHER PUBLICATIONS

"FileStore Database Analysis Scheme for IBM LAN NetView Scan", *IBM Technical Disclosure Bulletin*, vol. 37, No. 7, Jul. 1994, pp. 513–514.

*Primary Examiner*—Paul V. Kulik
*Attorney, Agent, or Firm*—Gray Cary Ware & Freidenrich

[57] ABSTRACT

Files are stored along with embedded codes containing information useful in reconstructing a failed database that normally contains information about the files. Multiple user files are stored in the form of a managed file, identified by a managed filename. Storage of the managed file includes a number of sub-steps, among them the generation and storage of a first frame marker including a recognition pattern, the managed filename, a next-frame locator, and a sequence number distinguishing the first frame marker from other frame markers. Next, a self-describing header is generated and stored adjacent to the first frame marker. A first one of the user files is stored adjacent to the self-describing header. The self-describing header and following user file are exclusively associated with each other, and the header contains certain information about the adjacent user file. Storage of the user file and self-describing header may be punctuated by one or more intermittent frame markers, which are preferably stored at fixed intervals along the managed file. The sequence of storing a self-describing header, a user file, and any intermittent frame markers is repeated until a predetermined condition is satisfied, such as reaching the last user file for inclusion in the managed file. Then, a table-of-contents is generated and stored substantially adjacent the last user file. A frame trailer is then stored substantially adjacent the table-of-contents, the frame trailer containing information representing the position of the table-of-contents. Another aspect of the invention concerns database reconstruction using information including the embedded codes.

52 Claims, 11 Drawing Sheets